US012726091B2

(12) United States Patent
Hikima et al.

(10) Patent No.: US 12,726,091 B2
(45) Date of Patent: Sep. 1, 2026

(54) COIL INSERTION APPARATUS AND COIL INSERTION METHOD

(71) Applicant: HONDA MOTOR CO., LTD., Tokyo (JP)

(72) Inventors: Norihiko Hikima, Tokyo (JP); Yasuto Ohashi, Tokyo (JP); Takumi Miyamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 705 days.

(21) Appl. No.: 18/183,168

(22) Filed: Mar. 14, 2023

(65) Prior Publication Data

US 2023/0318414 A1 Oct. 5, 2023

(30) Foreign Application Priority Data

Mar. 31, 2022 (JP) ................................ 2022-059910

(51) Int. Cl.
*H02K 15/067* (2025.01)
*H02K 15/026* (2025.01)

(52) U.S. Cl.
CPC ......... *H02K 15/067* (2013.01); *H02K 15/026* (2013.01)

(58) Field of Classification Search
CPC .. H02K 15/067; H02K 15/026; H02K 15/066; H02K 15/062; H02K 15/068
See application file for complete search history.

(56) References Cited

U.S. PATENT DOCUMENTS

| | | | | |
|---|---|---|---|---|
| 10,396,638 | B2 * | 8/2019 | Noji | H02K 15/085 |
| 2014/0201979 | A1 * | 7/2014 | Yamaguchi | H02K 15/026 29/596 |
| 2017/0373570 | A1 * | 12/2017 | Muto | H02K 3/04 |
| 2018/0091029 | A1 | 3/2018 | Hashimoto et al. | |
| 2019/0199183 | A1 * | 6/2019 | Mizushima | H02K 15/00 |

FOREIGN PATENT DOCUMENTS

| | | | | |
|---|---|---|---|---|
| JP | S6062853 | A | 4/1985 | |
| JP | 2005110341 | A | 4/2005 | |
| JP | 2013055862 | A | 3/2013 | |
| JP | 6390772 | B2 | 9/2018 | |
| JP | 2019126195 | A * | 7/2019 | |
| JP | 2021191126 | A * | 12/2021 | H02K 15/062 |
| WO | 2016129197 | A1 | 8/2016 | |

OTHER PUBLICATIONS

Notification of Reasons for Refusal issued in the JP Patent Application No. 2022-059910, mailed on Oct. 3, 2023.

* cited by examiner

*Primary Examiner* — Thomas J Hong
*Assistant Examiner* — Jose K Abraham
(74) *Attorney, Agent, or Firm* — CKC & Partners Co., LLC

(57) ABSTRACT

A coil insertion apparatus includes a coil diameter expander that expands a diameter of a coil assembly in a wound state from inside a stator core to insert the coil assembly into slots of the stator core, the coil diameter expander including a coil end pressing part that presses coil ends of the coil assembly from inside toward outside to expand the diameter, and a coil straight part pressing part that presses coil straight parts of the coil assembly to be inserted into the slots from inside toward outside to expand the diameter.

6 Claims, 20 Drawing Sheets

C
533a
533
533
532
533a
533a
533
533a
533
533a
530
533a
533
534
533
533a
533a
533
533
533a
533a
533
533
533a
533a
533

COIL INSERTION APPARATUS AND COIL INSERTION METHOD

This application is based on and claims the benefit of priority from Japanese Patent Application No. 2022-059910, filed on 31 Mar. 2022, the content of which is incorporated herein by reference.

BACKGROUND OF THE INVENTION

Field of the Invention

The present invention relates to a coil insertion apparatus and a coil insertion method.

Related Art

Conventionally, such a method is known that coils each wound into an annular shape are inserted inside a stator core, a roller eccentrically disposed inside the coils is used to press the coils into slots of the stator core from inside toward outside to expand a diameter of the coils, and thus the coils are attached to the slots of the stator core (for example, see Japanese Patent No. 6390772).

Patent Document 1: Japanese Patent No. 6390772

SUMMARY OF THE INVENTION

However, since the roller that presses the coils only partially presses the coils in circumferential directions, it is necessary to rotate the coils one or more revolutions to insert the whole circumference of the coils into the slots. Therefore, there are some issues including that a task of inserting coils into slots requires more man-hours, and, since pressing locations on the coils by the roller always move in the circumferential directions of the coils, a state of expanding the coils in diameter easily becomes unstable.

An object of the present invention is to provide a coil insertion apparatus and a coil insertion method that make it possible to improve the workability of coil insertion into slots.

(1) A coil insertion apparatus according to the present invention is directed to a coil insertion apparatus (for example, a coil insertion apparatus 1 described later) including a coil diameter expander (for example, coil diameter expansion devices 5 described later) that expands a diameter of a coil assembly (for example, a belt-shaped coil 100 described later) in a wound state from inside a stator core (for example, a stator core 2 described later) to insert the coil assembly into slots (for example, slots 22 described later) of the stator core, the coil diameter expander including a coil end pressing part (for example, coil end pressing parts 53 described later) that presses coil ends (for example, coil ends 103 described later) of the coil assembly from inside toward outside to expand the diameter, and a coil straight part pressing part (for example, a coil straight part pressing part 56, 57 described later) that presses coil straight parts (for example, coil straight parts 102 described later) of the coil assembly to be inserted into the slots from inside toward outside to expand the diameter.

(2) In the coil insertion apparatus according to (1) described above, the coil straight part pressing part (for example, the coil straight part pressing part 57 described later) may include fixed projections (for example, fixed projections 572 described later) that are respectively inserted from an end face (for example, end faces 2*a* described later) of the stator core into the slots to press the coil straight parts respectively in the slots.

(3) In the coil insertion apparatus according to (1) described above, the coil straight part pressing part (for example, the coil straight part pressing part 56 described later) may include movable projections (for example, movable projections 562 described later) that move from inside the stator core toward outside in radial directions to press the coil straight parts respectively in the slots.

(4) In the coil insertion apparatus according to any one of (1) to (3) described above, the coil diameter expander may further include a limiter (for example, limiters 55 described later) that is disposed outside the coil assembly, that limits outward movements of the coil ends to be expanded in diameter by the coil end pressing part, and that pinches the coil ends with the coil end pressing part.

(5) In the coil insertion apparatus according to (4) described above, an inner circumferential surface (for example, inner circumferential surfaces 55*a* described later) of the limiter may be a surface perpendicular to the end face (for example, the end faces 2*a* described later) of the stator core.

(6) In the coil insertion apparatus according to (4) described above, an inner circumferential surface (for example, the inner circumferential surfaces 55*a* described later) of the limiter may be an inclined surface that is inclined toward outside in the radial directions at an increasing distance from the end face (for example, the end faces 2*a* described later) of the stator core.

(7) A coil insertion method according to the present invention is directed to a coil insertion method of expanding a diameter of a coil assembly (for example, the belt-shaped coil 100 described later) in a wound state from inside a stator core (for example, the stator core 2 described later) to insert the coil assembly into slots (for example, the slots 22 described later) of the stator core, the coil insertion method including: coil end diameter expanding of allowing a coil end pressing part (for example, the coil end pressing parts 53 described later) disposed inside the coil assembly to press coil ends (for example, the coil ends 103 described later) of the coil assembly from inside toward outside to expand the diameter; and coil straight part diameter expanding of allowing a coil straight part pressing part (for example, the coil straight part pressing part 56, 57 described later) disposed inside the coil assembly to press coil straight parts (for example, the coil straight parts 102 described later) of the coil assembly to be inserted into the slots from inside toward outside to expand the diameter, in which the coil straight part diameter expanding is executed together with the coil end diameter expanding to press both the coil ends and the coil straight parts of the coil assembly.

(8) In the coil insertion method according to (7) described above, outward movements of the coil ends to be expanded in diameter by the coil end pressing part may be limited by a limiter (for example, the limiters 55 described later) disposed outside the coil ends and the coil ends of the coil assembly inserted into the slots may be pinched between the coil end pressing part and the limiter.

According to (1) described above, the coil ends of the coil assembly to be inserted into the slots are pressed by the coil end pressing part to expand the diameter, and the coil straight parts are also pressed by the coil straight part pressing part to expand the diameter. Thereby, the coil assembly is pressed in a well-balanced manner with respect to the slots, preventing the coil assembly from being deformed and curved when it is expanded in diameter. Therefore, with this coil insertion apparatus, it is possible to improve the workability of coil insertion into slots.

According to (2) described above, since, by respectively inserting the fixed projections of the coil straight part pressing part from one of the end faces of the stator core into the slots, the fixed projections press the coil straight parts in the slots, it is possible to effectively prevent the coil assembly from being deformed and curved when it is expanded in diameter.

According to (3) described above, since, by moving the movable projections of the coil straight part pressing part disposed inside the stator core toward outside in the radial directions, the movable projections press the coil straight parts respectively in the slots, it is possible to effectively prevent the coil assembly from being deformed and curved when it is expanded in diameter. By reducing the movable projections in diameter when the coil straight part pressing part is to be inserted inside the stator core, it is possible to prevent the movable projections from scratching the coil straight parts and from damaging the coil straight parts.

According to (4) described above, the coil ends are pinched between the coil end pressing part and the limiter, making it possible to counteract spring-back effects that occur at the coil ends. Therefore, it is possible to suppress inward return of the coils after insertion into the slots due to the spring-back effects of the coil ends, making it possible to further improve the workability of coil insertion. Pinching the coil ends between the coil end pressing part and the limiter also eliminates gaps between the coils laminated in the slots.

According to (5) described above, it is possible to evenly apply pressing forces to the coil ends to lay out the coil ends on the end faces of the stator core in a tidy manner.

According to (6) described above, since it is possible to incline the coil ends toward outside in the radial directions, it is possible to suppress the projection height of each of the coil ends and to easily secure the respective inner-diameter-side spaces for the coil ends.

According to (7) described above, the coil ends of the coil assembly to be inserted into the slots are pressed by the coil end pressing part to expand the diameter, and the coil straight parts are also pressed by the coil straight part pressing part to expand the diameter. Thereby, the coil assembly is pressed in a well-balanced manner with respect to the slots, preventing the coil assembly from being deformed and curved when it is expanded in diameter. Therefore, with this coil insertion method, it is possible to improve the workability of coil insertion into slots.

According to (8) described above, the coil ends are pinched between the coil end pressing part and the limiter, making it possible to counteract spring-back effects that occur at the coil ends. Therefore, it is possible to suppress inward return of the coils after insertion into the slots due to the spring-back effects of the coil ends, making it possible to further improve the workability of coil insertion. Pinching the coil ends between the coil end pressing part and the limiter also eliminates gaps between the coils laminated in the slots.

DETAILED DESCRIPTION OF THE INVENTION

Figure 1:
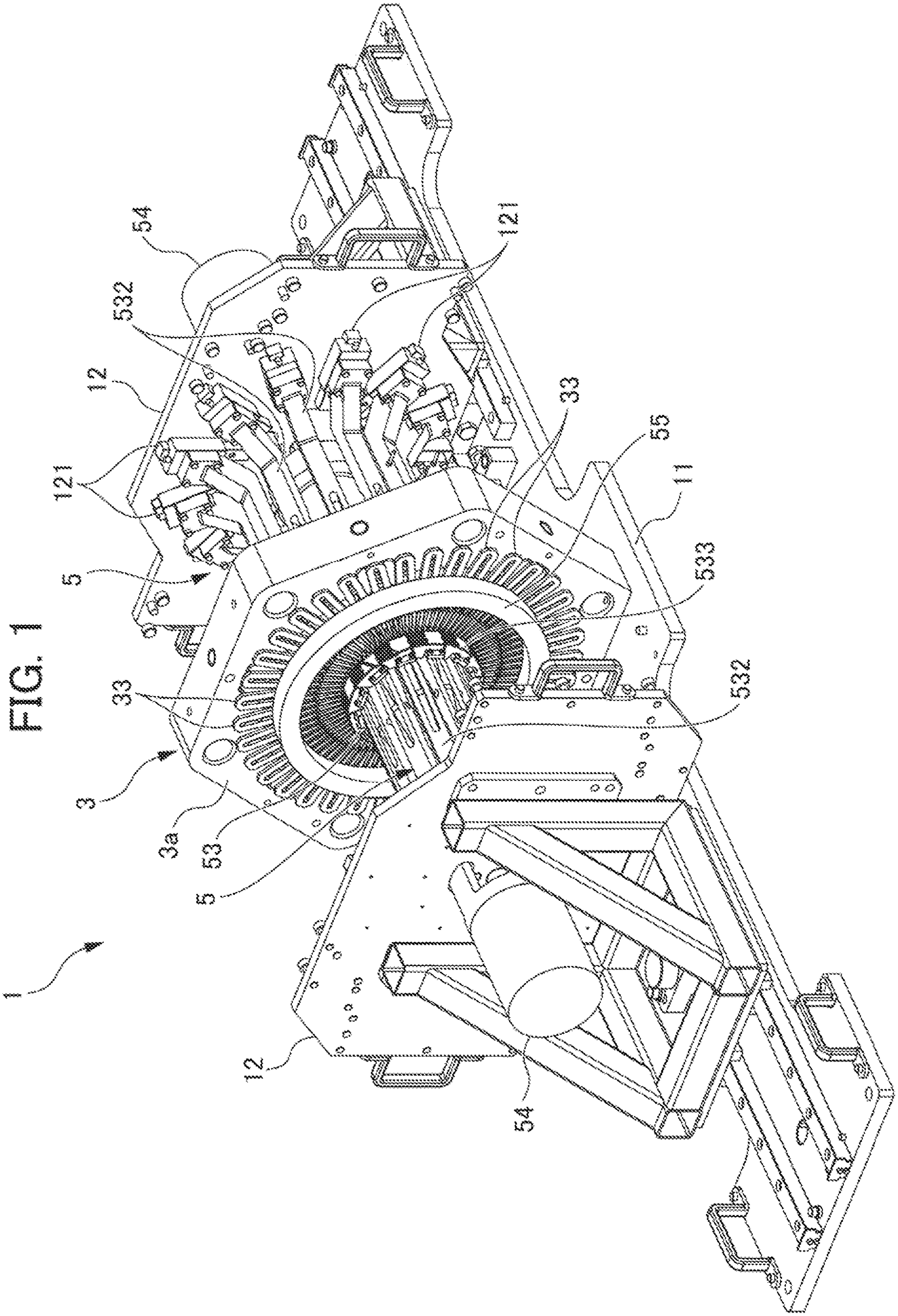
FIG. 1 is a perspective view illustrating a coil insertion apparatus according to an embodiment of the present invention.
Figure 2:
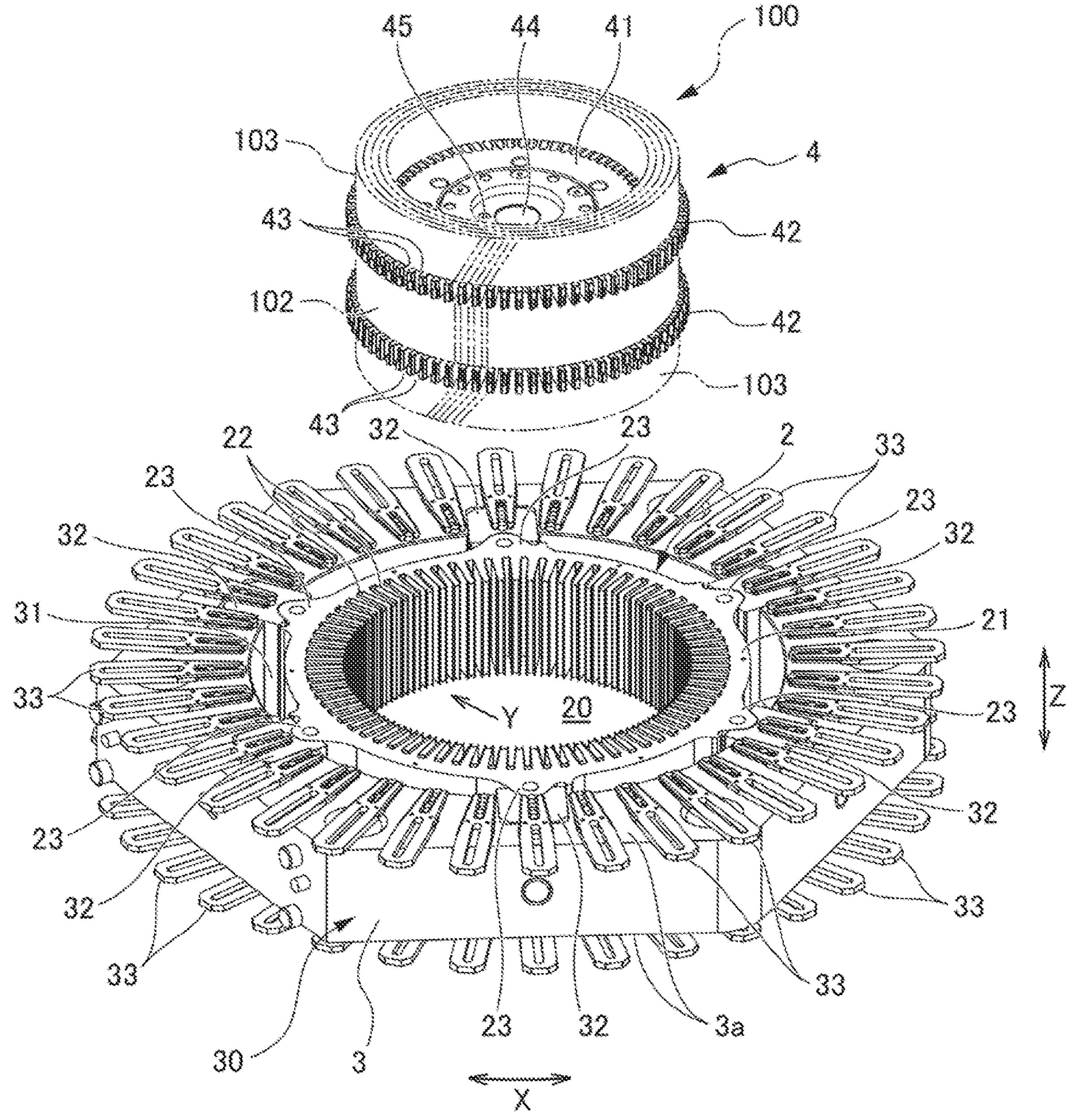
FIG. 2 is a perspective view illustrating in an exploded manner a stator core fixing jig to which a stator core is fixed and a coil winding jig in the coil insertion apparatus.

Embodiments of the present invention will now be described herein in detail with reference to the accompanying drawings. As illustrated in FIGS. 1 and 2, a coil insertion apparatus 1 includes a stator core 2, a stator core fixing jig 3 that fixes the stator core 2, a coil winding jig 4 that is to be inserted inside the stator core 2 and that has wound thereon a belt-shaped coil 100 into an annular shape, and coil diameter expansion devices 5 that cause the belt-shaped coil 100 wound onto the coil winding jig 4 to move and expand in diameter.

Figure 3:
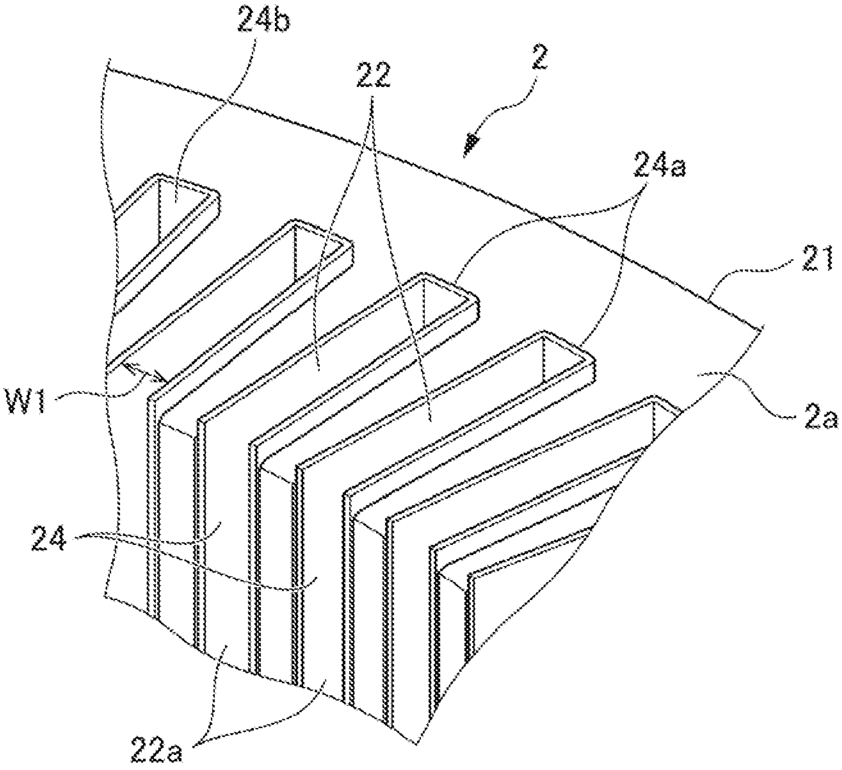
FIG. 3 is a perspective view illustrating a configuration of slots of the stator core.

The stator core 2 includes, as illustrated in FIGS. 2 and 3, for example, an annular part 21 that is a laminated body in which a plurality of thin core plates are laminated with each other. There is a through hole 20 passing through the annular part 21 at its center in axial directions. The stator core 2 has a plurality of slots 22 passing through in the axial directions of the stator core 2. The slots 22 are arranged radially at constant intervals in circumferential directions of the annular part 21 and respectively have openings 22*a* each opening toward the through hole 20. The stator core 2 according to the present embodiment has the 72 slots 22. The annular part 21 of the stator core 2 has, on its outer circumference, six tabs 23 that project and that are arranged at constant intervals.

Note that, in the stator core 2, as illustrated in FIG. 2, X directions in which the slots 22 are arranged represent the circumferential directions. Y directions extending in radiation directions from the center of the through hole 20 represent radial directions. Z directions represent the axial directions.

The stator core fixing jig 3 has, as illustrated in FIG. 2, a hexagonal column shape having a size in the axial directions that is substantially equal to the size in the axial directions of the stator core 2, and has, at its center, a stator core insertion hole 31 into which it is possible to insert and dispose the stator core 2. In the coil insertion apparatus 1 according to the present embodiment, the stator core fixing jig 3 is, to align the axial directions of the stator core 2 fixed in the stator core insertion hole 31 with horizontal directions, fixed at a center part of a base 11 of the coil insertion apparatus 1.

The stator core fixing jig 3 fixes the stator core 2 in the stator core insertion hole 31 at a predetermined position and posture. Specifically, the stator core fixing jig 3 has, as illustrated in FIG. 2, at positions corresponding to the positions of the six tabs 23 of the stator core 2, six core holding blocks 32 that are movable to project and retract relative to the stator core insertion hole 31. The stator core fixing jig 3 causes, after the stator core 2 is inserted into the stator core insertion hole 31, the core holding blocks 32 to respectively project into the stator core insertion hole 31 through driving of actuators such as cylinders that are not illustrated. Thereby, the core holding blocks 32 respectively grip, as illustrated in FIG. 2, the tabs 23 of the stator core 2 to fix the stator core 2 in the stator core insertion hole 31 at the predetermined position and posture.

The slots 22 of the stator core 2 are, as illustrated in FIG. 3, respectively attached beforehand with pieces of insulating paper 24. The pieces of insulating paper 24 are each bent and formed into a substantially C-letter shape to fit the shape of the inner surface of a substantially C-letter shape of each of the slots 22 when the stator core 2 is seen in the axial directions. The pieces of insulating paper 24 respectively attached in the slots 22 each have cuffs 24*a* projecting from each of the slots 22 each at a predetermined height in the axial directions of the stator core 2. The cuffs 24*a* respectively project from the slots 22 toward both outsides in the axial directions of the stator core 2.

As illustrated in FIG. 2, on both end faces 3*a*, 3*a* in the axial directions of the stator core fixing jig 3 to which the stator core 2 is fixed, a plurality of cuff guides 33 are attached and arranged radially at constant intervals in the circumferential directions. The cuff guides 33 are respectively provided to be movable in the radial directions of the stator core 2 through driving of actuators such as cylinders that are not illustrated. The cuff guides 33 are each formed into a long, thin plate shape in the radial directions of the stator core 2. The cuff guides 33 are respectively open toward inside the stator core fixing jig 3, and support, when the belt-shaped coil 100 is to be inserted, the pieces of insulating paper 24 in the slots 22 by pinching, from both sides, the cuffs 24*a* of the pieces of insulating paper 24.

The coil winding jig 4 has, as illustrated in FIG. 2, a jig main body 41 having a substantially cylindrical shape, a plurality of comb teeth 42 projecting radially from the outer circumference of the jig main body 41, a plurality of comb tooth grooves 43 each formed between two of the comb teeth 42 adjacent in the circumferential directions, and a shaft hole 44 that is open on the jig main body 41 at its center. The comb teeth 42 and the comb tooth grooves 43 are respectively provided on the both ends in the axial directions of the jig main body 41. The comb teeth 42 and the comb tooth grooves 43 respectively on the both ends of the jig main body 41 are respectively aligned with each other in phase in the axial directions. The comb tooth grooves 43 arranged in the circumferential directions of the jig main body 41 coincide in number with the slots 22 provided on the stator core 2. Therefore, the coil winding jig 4 according to the present embodiment has the 72 comb tooth grooves 43. To make it possible to insert the coil winding jig 4 inside the annular part 21 of the stator core 2, the outer diameter of the coil winding jig 4, which is defined by the positions of the tips of the comb teeth 42, is formed smaller than the inner diameter of the stator core 2.

Figure 4:
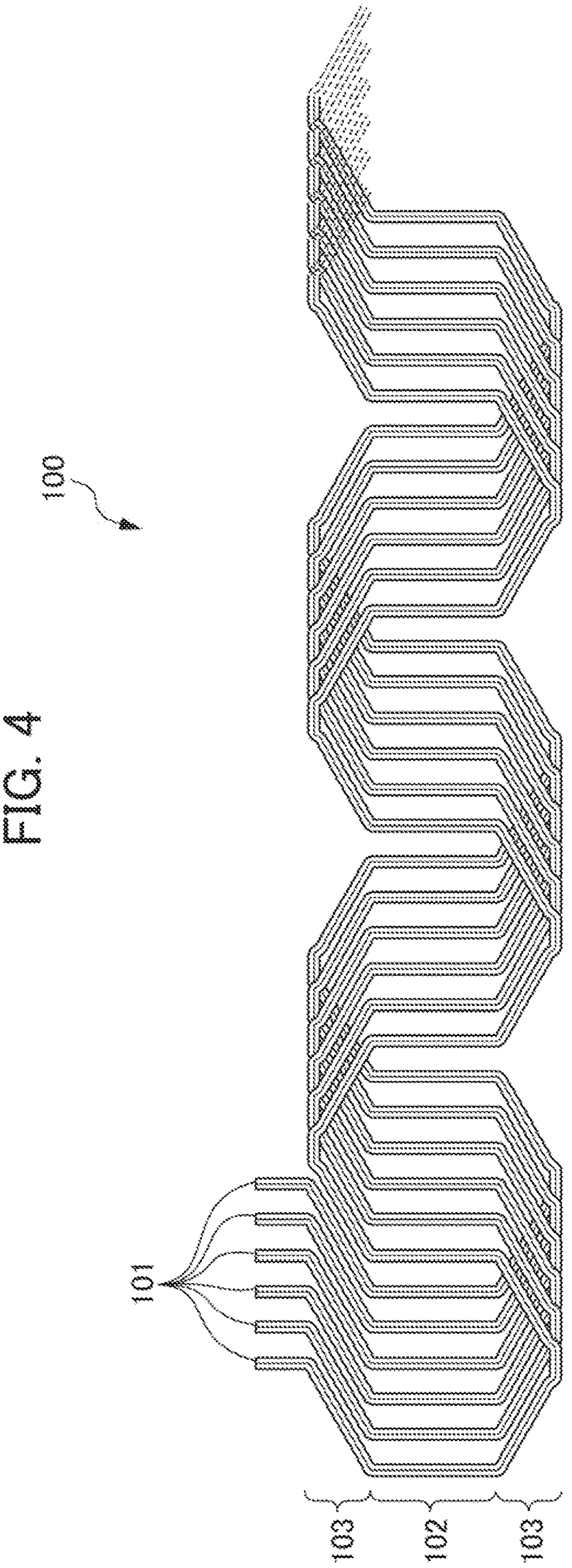
FIG. 4 is a front view illustrating a coil assembly according to an embodiment.

The belt-shaped coil 100 is to be wound onto the coil winding jig 4 into an annular shape. The belt-shaped coil 100 is, as illustrated in FIG. 4, a coil assembly of long belt shaped, continuous wave-winding coils formed from flat square conductive wires 101 made of copper, aluminum, or another material having a substantially rectangular cross-sectional shape. As the coil assembly, it is possible to use a plurality of segment coils each formed into a substantially U-letter shape, instead of the wave-winding coils. However, since the continuous wave-winding coils do not require such a main stream technology commonly used in the world that, when setting coils into slots of a stator core, the coils are each formed and separated into a plurality of segments, and, after the coils are inserted into the slots, the coil ends are welded, it is possible to eliminate the necessity of using, for example, a high purity copper material for coils to allow thermal processing to be performed at welded locations. Therefore, it is also possible to use recycled copper materials containing impurities, making it possible to contribute to the realization of resource recycling. Furthermore, since the wave-winding coils do not require welding, it is possible to achieve coils with reduced weight and to further achieve a rotating electrical machine with reduced weight by using the coils. When such a rotating electrical machine is installed on a hybrid car, the vehicle weight is reduced, making it possible to reduce carbon dioxide and to further reduce adverse effects on the global environment.

The belt-shaped coil 100 has a plurality of coil straight parts 102 and a plurality of coil ends 103. The coil straight parts 102 are portions to be inserted into the slots 22 of the stator core 2, each extend substantially linearly, and are disposed in parallel with each other at constant intervals. The coil ends 103 are respectively disposed at positions more adjacent to the side ends of the belt-shaped coil 100 than the coil straight parts 102. Each two adjacent ones of the coil straight parts 102 are coupled to each other to alternately arrange one ends and other ends each formed into a mountain shape. The coil ends 103 are portions disposed to respectively project, when the belt-shaped coil 100 is attached to the slots 22 of the stator core 2, from the slots 22 in the axial directions of the stator core 2. The belt-shaped coil 100 according to the present embodiment is formed into a long belt shape by bundling the six flat square conductive wires 101 respectively bent and formed with the plurality of coil straight parts 102 and the plurality of coil ends 103 to allow the coil straight parts 102 to be parallel to each other at constant intervals.

Before insertion inside the stator core 2, the coil winding jig 4 winds in multiples the belt-shaped coil 100 by sequentially inserting the coil straight parts 102 of the belt-shaped coil 100 respectively into the comb tooth grooves 43. Thereby, as illustrated in FIG. 2, the coil winding jig 4 onto which the belt-shaped coil 100 has been wound into an annular shape is formed.

The coil winding jig 4 that has wound the belt-shaped coil 100 into an annular shape is held, by the coil diameter expansion devices 5 that pinch the stator core fixing jig 3 and that are disposed on the both sides of the stator core fixing jig 3, in the stator core insertion hole 31 at the predetermined position and the predetermined posture. The coil diameter expansion devices 5 according to the present embodiment configure a coil diameter expander. Respective main bodies 50 of the coil diameter expansion devices 5 face each other, as illustrated in FIG. 1, in the axial directions with respect to the coil winding jig 4 inserted inside the stator core 2.

Figure 5:
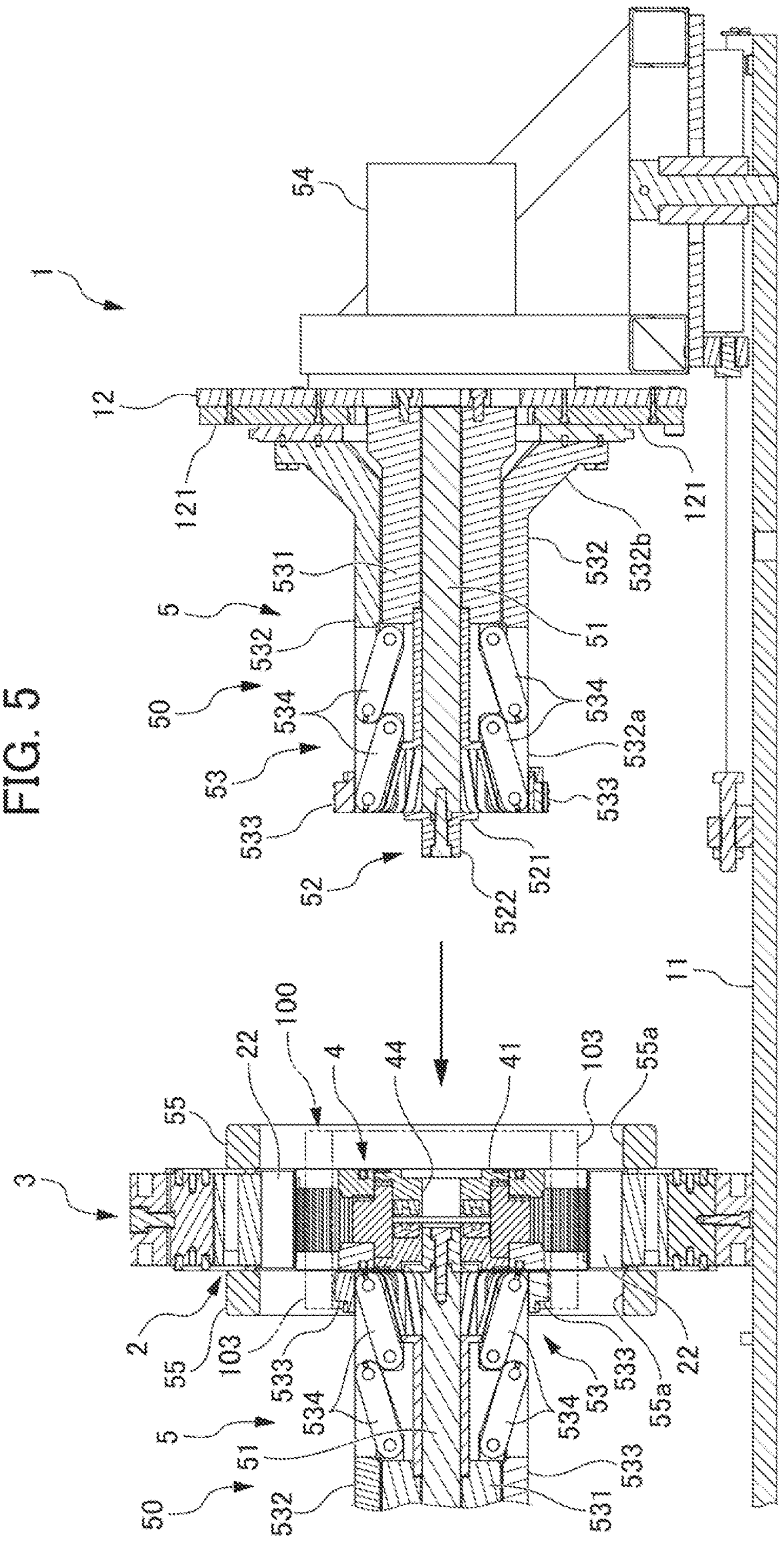
FIG. 5 is a cross-sectional view of the coil insertion apparatus, illustrating how coil diameter expansion devices are attached to the coil assembly.

As illustrated in FIGS. 1 and 5, the coil insertion apparatus 1 is provided in a standing manner with a pair of support substrates 12, 12 facing each other on the base 11 fixing the stator core fixing jig 3 to pinch the stator core fixing jig 3. The coil diameter expansion devices 5 respectively project in the horizontal directions from the support substrates 12 toward the coil winding jig 4 inserted inside the stator core 2. The coil diameter expansion devices 5 are respectively provided to be movable, as the support substrates 12 move linearly on the base 11 through driving of motors, for example, which are not illustrated, in either directions in which the coil diameter expansion devices 5 abut the coil winding jig 4 or directions in which the coil diameter expansion devices 5 are away from the coil winding jig 4.

Figure 7:
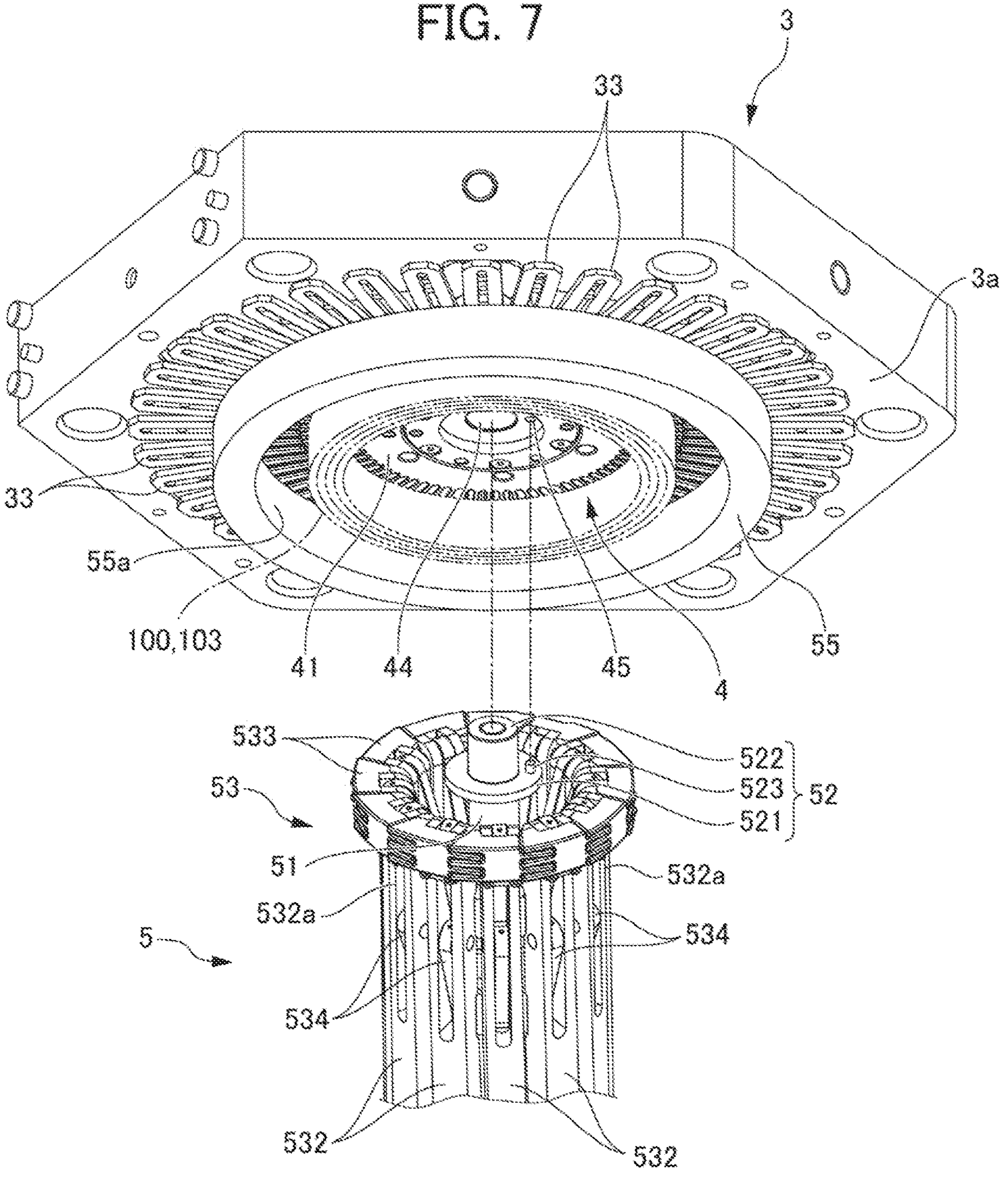
FIG. 7 is a perspective view illustrating how the coil diameter expansion device is inserted inside the coil assembly.

The coil diameter expansion devices 5 respectively have, at their centers, as illustrated in FIGS. 5 and 7, main shafts 51 respectively extending from the support substrates 12 toward the coil winding jig 4 inserted inside the stator core 2. The main shafts 51 are respectively provided with, at their tips, holders 52 that hold the coil winding jig 4 inside the stator core 2 at the predetermined position and posture. The holders 52 respectively have shaft projections 522 projecting from the centers of end plates 521 that are respectively disposed at the tips of the main shafts 51 and that each have a circular shape, and positioning projections 523 respectively projecting from the end plates 521, the positions of which are outside in the radial directions of the shaft projections 522, in identical directions to those in which the shaft projections 522 project. The shaft projections 522 fit the shaft hole 44 of the coil winding jig 4. The positioning projections 523 fit positioning holes 45 provided outside in the radial directions of the shaft hole 44 of the coil winding jig 4.

Figure 6:
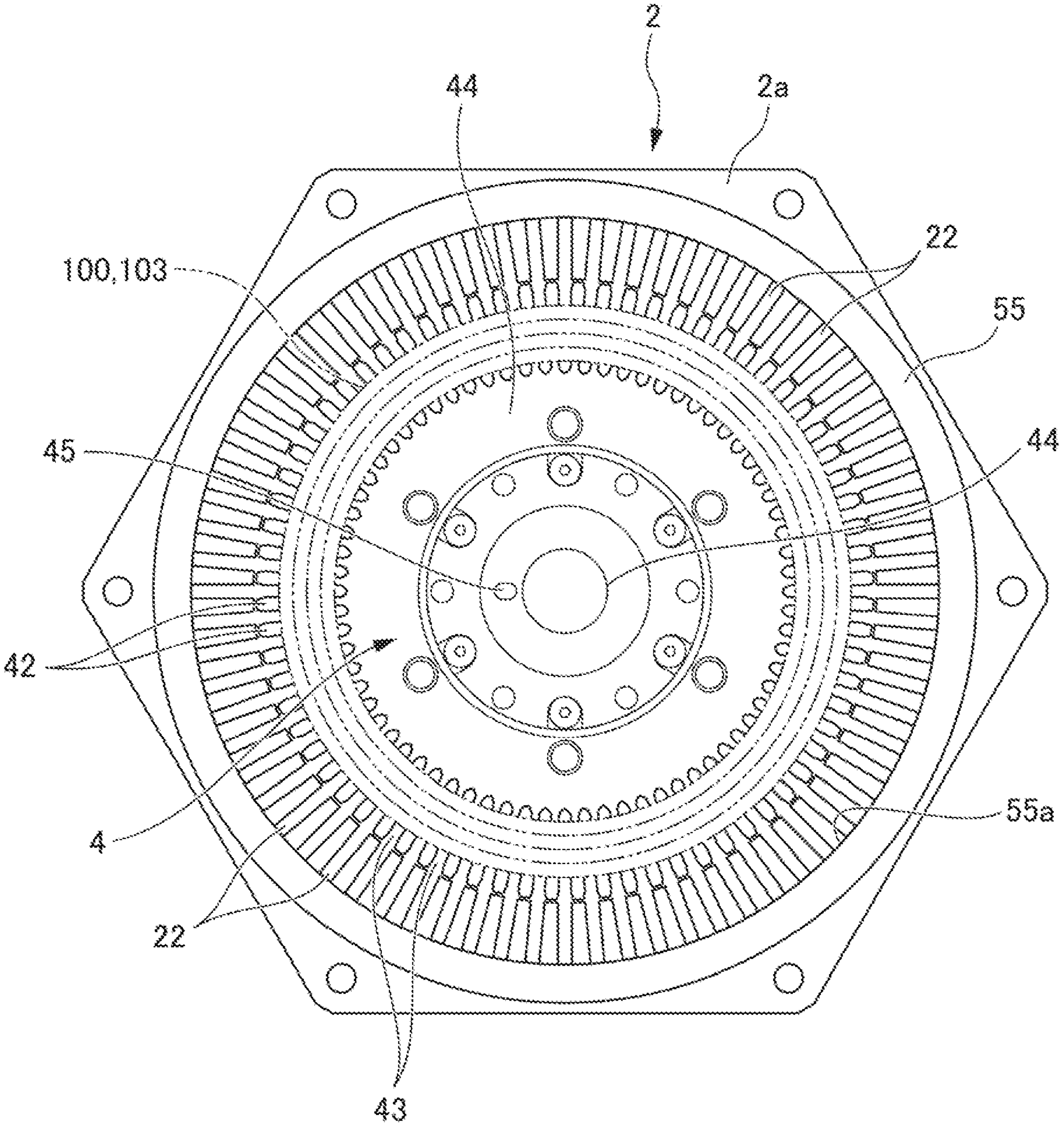
FIG. 6 is a plan view illustrating the coil assembly in the stator core and a limiter.

The positioning holes 45 of the coil winding jig 4 and the positioning projections 523 of the holders 52 are provided and positioned beforehand to allow, when they fit each other, the slots 22 of the stator core 2 fixed to the stator core fixing jig 3 and the comb tooth grooves 43 of the coil winding jig 4 inserted inside the stator core 2 to coincide with each other in phase. Therefore, when the coil diameter expansion devices 5 respectively move toward the stator core fixing jig 3, and the shaft hole 44 and the positioning holes 45 of the coil winding jig 4 and the shaft projections 522 and the positioning projections 523 of the holders 52 respectively fit each other, the coil winding jig 4 is held, as illustrated in FIG. 6, in a state where the comb tooth grooves 43 and the slots 22 of the stator core 2 coincide with each other in phase. Thereby, the interiors of the slots 22 of the stator core 2 and the interiors of the comb tooth grooves 43 of the coil winding jig 4 are in communication with each other in the radial directions.

The coil diameter expansion devices 5 respectively include coil end pressing parts 53 outside the outer circumferences of the main shafts 51. The coil end pressing parts 53 respectively include movable cylinders 531 that respectively fit the outer circumferences of the main shafts 51, pluralities of movable arms 532 respectively further disposed outside the outer circumferences of the movable cylinders 531, and pluralities of piece members 533 respectively provided at the tips of the movable arms 532.

The movable cylinders 531 are respectively shorter in length than the main shafts 51, and are respectively provided to be slidable in the axial directions of the main shafts 51 through driving of actuators 54 such as cylinders respectively disposed behind the support substrates 12.

The pluralities of movable arms 532 respectively extend in the axial directions of the main shafts 51, and are respectively disposed outside the outer circumferences of the movable cylinders 531 in the circumferential directions at constant intervals. The coil end pressing parts 53 according to the present embodiment each include the twelve movable arms 532 arranged in the circumferential directions of each of the main shafts 51. The support substrates 12 are each provided with, on its surface, twelve guide rails 121 arranged radially toward outside in the radial directions around each of the main shafts 51. Rear ends **532*b* of the movable arms 532 are respectively attached to be movable along the guide rails 121. The movable arms 532 respectively bend, from the guide rails, and extend in the axial directions of each of the movable cylinders 531 to points near the outer circumference of each of the holders 52. Tips 532*a* of the movable arms 532 are each coupled to the outer circumferential surface, at a point near the tip of each of the movable cylinders 531 via each two links 534** that are turnably attached.

The piece members 533 each have, as illustrated in FIGS. 8 to 11, a substantially fan shape, and are respectively provided, in a one-by-one manner, at the tips of the movable arms 532. Therefore, the coil end pressing parts 53 according to the present embodiment each include the twelve piece members 533 disposed in an annular shape. The piece members 533 each have a pair of engaging projection pieces 533*a* on one end in the circumferential directions of each of the coil end pressing parts 53 (the circumferential directions of the pluralities of piece members 533 each having an annular shape) and a pair of engaging grooves 533*b* on another end in the circumferential directions, which engage with the pair of engaging projection pieces 533*a*. The pair of engaging projection pieces 533*a* are respectively disposed in parallel to the axial directions of each of the coil end pressing parts 53, and project continuously and in parallel to the circumferential directions on an outer circumferential surface 530 of each of the coil end pressing parts 53. The twelve piece members 533 are arranged into an annular shape outside the outer circumference of each of the holders 52 when the pair of engaging projection pieces 533*a* and the pair of engaging grooves 533*b* of the piece members 533, 533, which are adjacent to each other in the circumferential directions, engage with each other. Note that the circumferential directions on each of the coil end pressing parts 53 are represented by C directions illustrated in FIGS. 8 to 11.

Figure 8:
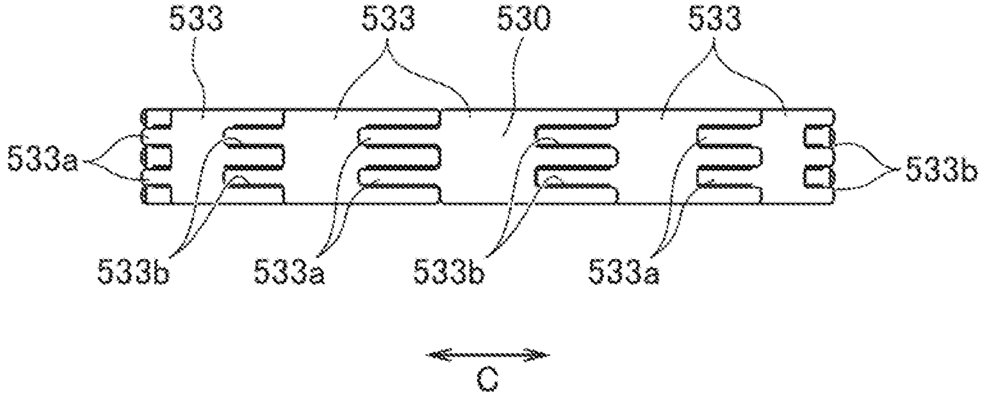
FIG. 8 is a side view illustrating the coil end pressing part in a reduced diameter state of the coil diameter expansion device.
Figure 9:
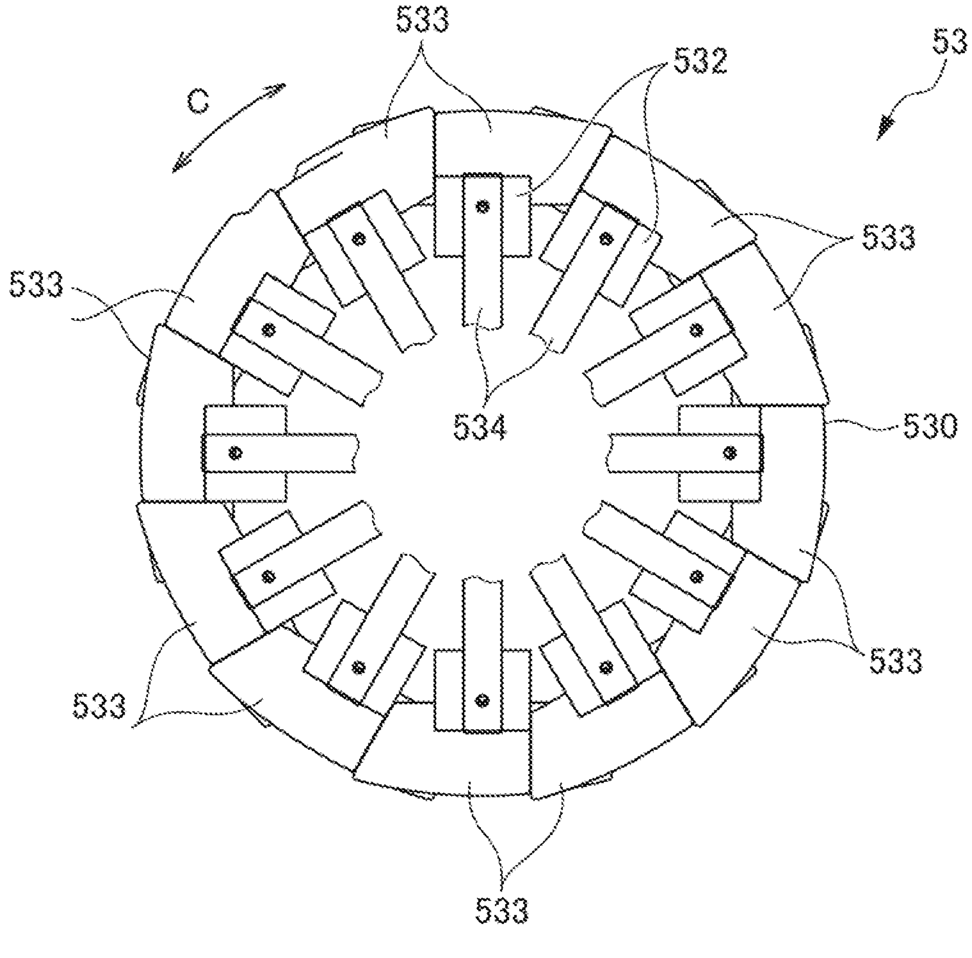
FIG. 9 is a front view illustrating the coil end pressing part in a reduced diameter state of the coil diameter expansion device.

FIG. 5 illustrates a state where the movable cylinders 531 have respectively retracted toward the rear ends of the main shafts 51 (toward the support substrates 12). At this time, the movable arms 532 respectively move toward the inner ends of the guide rails 121 arranged radially, and are disposed to be most proximal to the outer circumferential surfaces of the movable cylinders 531. Thereby, the coil end pressing parts 53 each reach a state where, as illustrated in FIGS. 8 and 9, the twelve piece members 533 are in close contact with each other to maximally reduce in diameter. The outer diameters of the coil end pressing parts 53 when the piece members 533 are reduced in diameter are each smaller than the inner diameter formed by the coil ends 103 projecting, from the coil winding jig 4 that has wound the belt-shaped coil 100, in the axial directions into a cylindrical shape. The coil diameter expansion devices 5 are inserted, in a state where the pluralities of piece members 533 of the coil end pressing parts 53 are reduced in diameter, into the space formed by the coil ends 103 projecting in the axial directions of the coil winding jig 4 into a cylindrical shape to hold the coil winding jig 4 with the holders 52.

Figure 10:
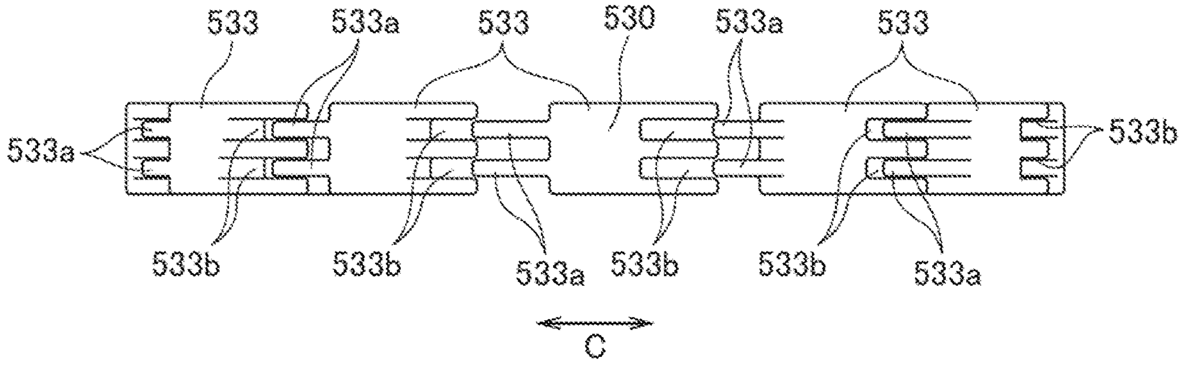
FIG. 10 is a side view illustrating the coil end pressing part in an expanded diameter state of the coil diameter expansion device.
Figure 11:
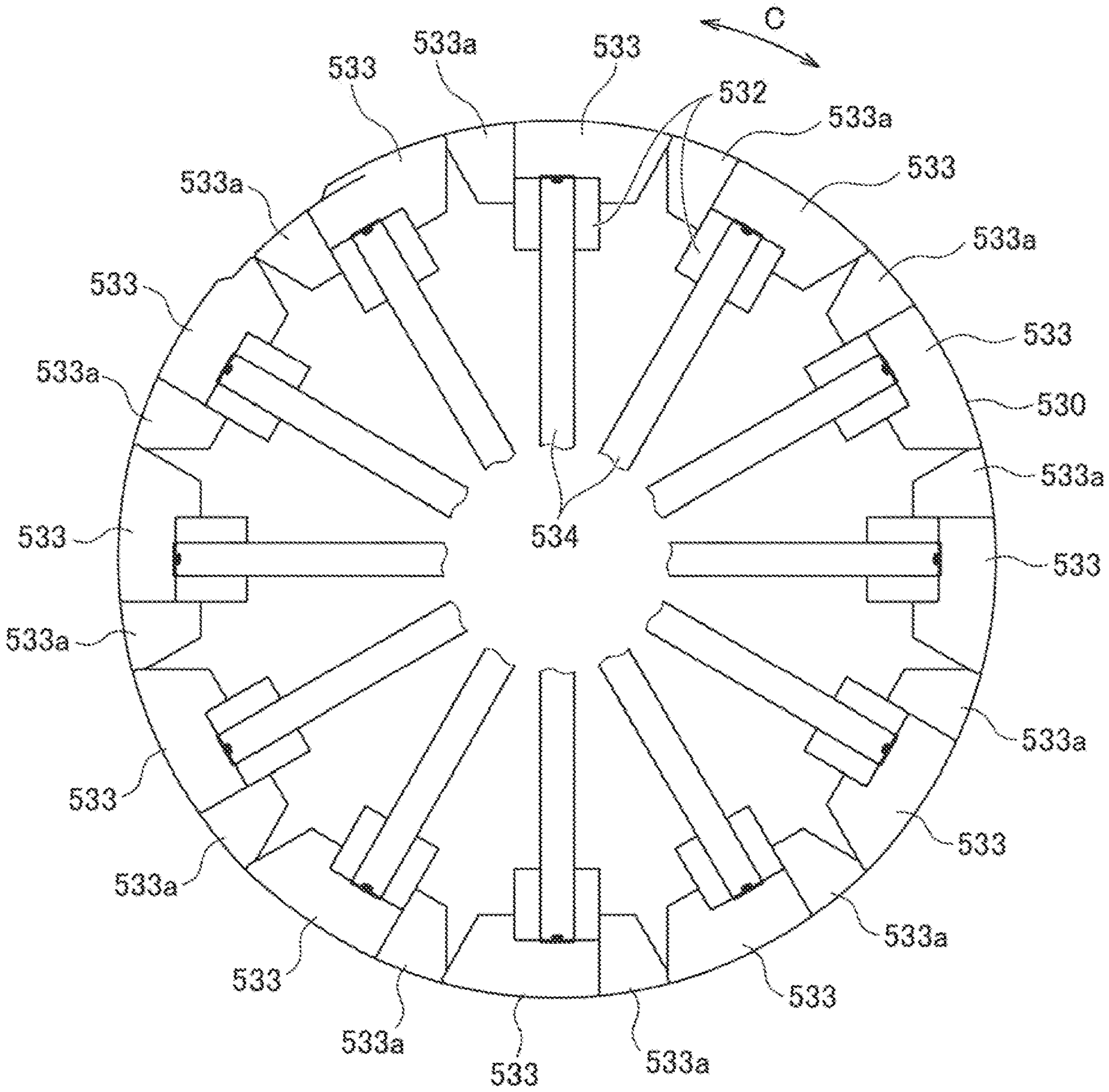
FIG. 11 is a side view illustrating the coil end pressing part in an expanded diameter state of the coil diameter expansion device.

When the movable cylinders 531 advance, through driving of the actuators 54, along the main shafts 51 toward the coil winding jig 4, the links 534 coupled to the movable cylinders 531 respectively turn and expand toward outside in the radial directions of the movable cylinders 531 to move the movable arms 532 respectively in parallel to each other along the guide rails toward outside. Thereby, the twelve movable arms 532 are away from each of the movable cylinders 531 toward outside in the radial directions. At this time, the coil end pressing parts 53 each reach a state where, as illustrated in FIGS. 10 and 11, adjacent piece members 533 are moved to expand from each other to maximally expand in diameter. The coil end pressing parts 53 when expanded are each greater in outer diameter than the coil winding jig 4. As the coil end pressing parts 53 expand in diameter, the coil ends 103 are moved from inside toward outside.

Note that, although, as illustrated in FIGS. 10 and 11, when the coil end pressing parts 53 have maximally expanded in diameter, neighboring members of the piece members 533, 533 are away from each other, the pair of engaging projection pieces 533*a* project in the circumferential directions between the piece members 533, 533. The engaging projection pieces 533*a* do not fully exit the engaging grooves 533*b* of each next one of the piece members 533, keeping the engagement with respect to the engaging grooves 533*b*. Therefore, each of the pluralities of piece members 533, which forms an annular shape with an expanded diameter, has the outer circumferential surface 530 that continues in the circumferential directions and that is closed. Therefore, when each of the coil end pressing parts 53 is seen in the circumferential directions, neighboring members of the piece members 533, 533 continue by the pair of engaging projection pieces 533*a*, where there is no such a groove (gap) formed to pass through each of the coil end pressing parts 53 in the radial directions.

The coil diameter expansion devices 5 respectively further include limiters 55, as illustrated in FIGS. 1, and 5 to 7. Although the limiters 55 according to the present embodiment are each formed into a cylindrical shape, the limiters 55 may be each formed into a plate shape that is open in a circular shape at its center part. The limiters 55 may be each divided into plural pieces in the circumferential directions. In this case, the divided pieces of each of the limiters 55 may be provided to be movable in the radial directions relative to the stator core 2. Note that the limiters 55 are omitted in FIG. 2. In FIG. 6, the stator core fixing jig 3 is omitted.

The limiters 55 are disposed, on both outsides the coil ends 103 of the belt-shaped coil 100, coaxially to the stator core 2. Specifically, the limiters 55 are disposed, as illustrated in FIGS. 5 and 6, on both end faces 2*a*, 2*a* in the axial directions of the stator core 2, coaxially to the belt-shaped coil 100 in a wound state, which is wound by the coil winding jig 4, to surround the whole circumference of the belt-shaped coil 100 in an annular shape. In the present embodiment, inner circumferential surfaces 55*a* of the limiters 55 are disposed slightly more outside than the outer-diameter-side positions of the slots 22 of the stator core 2 (positions of the groove bottoms of the slots 22).

The limiters 55 according to the present embodiment are respectively attached to both the end faces 2*a*, 2*a* of the stator core 2 after the stator core 2 is attached to the stator core fixing jig 3 by, for example, an attachment mechanism having a robot arm, which is not illustrated, to pinch the plurality of cuff guides 33 with the end faces 2*a*. Furthermore, although it is not illustrated, the limiters 55 may be configured to be respectively disposed coaxially to the outer circumferences of the coil end pressing parts 53 of the coil diameter expansion devices 5 and, at the same time when the coil end pressing parts 53 are inserted inside the belt-shaped coil 100, respectively disposed outside the belt-shaped coil 100.

The limiters 55 are disposed outside the slots 22 of the stator core 2 and, as will be described later, when the belt-shaped coil 100 is inserted into the slots 22 by the coil end pressing parts 53 that expand in diameter, pinch the coil ends 103 with the piece members 533 of the coil end pressing parts 53. The inner circumferential surfaces 55*a* of the limiters 55 according to the present embodiment respectively form surfaces perpendicular to the end faces 2*a* of the stator core 2. The inner circumferential surfaces 55*a* are surfaces perpendicular to moving directions of the belt-shaped coil 100, and are surfaces parallel to the axial directions, i.e., the Z directions of the stator core 2.

Figure 12:
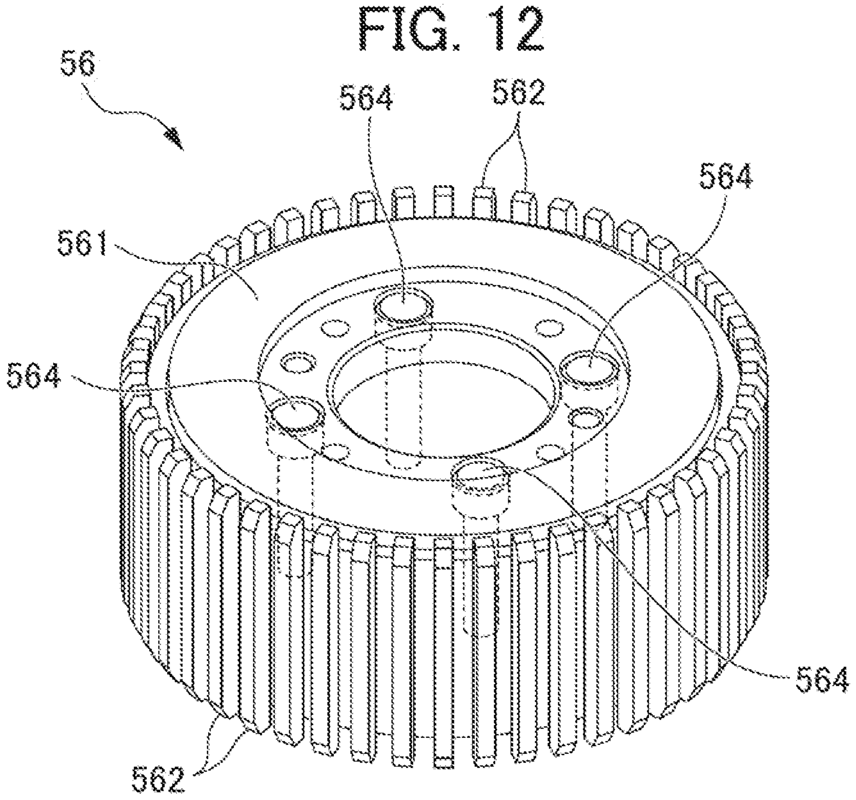
FIG. 12 is a perspective view illustrating a coil straight part pressing part according to an embodiment.
Figure 13:
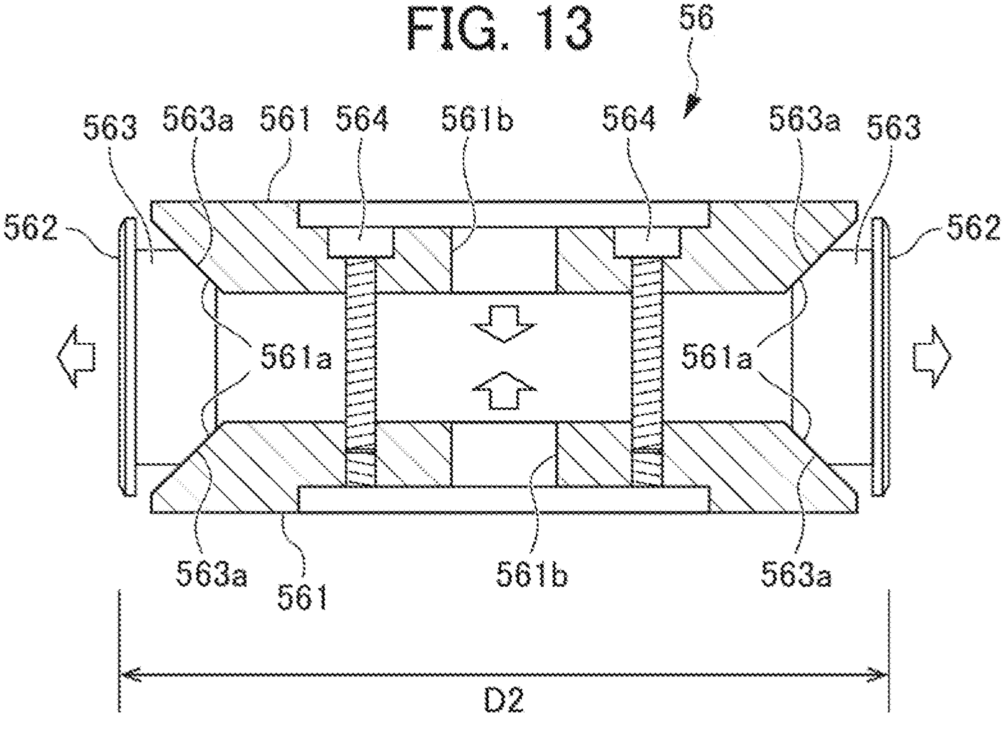
FIG. 13 is a cross-sectional view illustrating how the coil straight part pressing part illustrated in FIG. 12 performs a diameter expansion movement.

The coil diameter expansion devices 5 further include a coil straight part pressing part 56 illustrated in FIGS. 12 and 13. The coil straight part pressing part 56 is configured, similar to the limiters 55, as a component that is separate from the main bodies 50 of the coil diameter expansion devices 5. The coil straight part pressing part 56 is inserted, into the through hole 20 of the stator core 2 after the coil winding jig 4 is removed, by one of the holders 52 of the coil diameter expansion devices 5, for example.

The coil straight part pressing part 56 includes, as illustrated in FIGS. 12 and 13, a pair of movable circular discs 561, 561, a plurality of movable projections 562, operating plates 563 respectively integrally provided to the movable projections 562, a plurality of bolts 564 that adjust a gap between the pair of movable circular discs 561, 561.

The movable circular discs 561 are each formed into a circular disc shape with a diameter smaller than the inner diameter of the through hole 20 of the stator core 2. The movable circular discs 561 are respectively formed with, on respective one surfaces and on the respective outer circumferences, tapered parts 561*a* that are inclined to be gradually thinner in thickness toward outside in the radial directions. The tapered parts 561*a* are respectively formed on the whole circumferences of the movable circular discs 561. The movable circular discs 561 are respectively formed with, at their center parts, shaft holes 561*b* into which the shaft projections 522 of the holders 52 of the coil diameter expansion devices 5 are insertable. The pair of movable circular discs 561, 561 are coupled to each other by the plurality of bolts 564 in a state where the surfaces respectively formed with the tapered parts 561*a* are disposed to face each other at a predetermined gap.

The movable projections 562 are respectively made from bar-shaped members extending in the axial directions of the stator core 2 to configure, on the coil straight part pressing part 56, pressing portions that abut and press the coil straight parts 102 of the belt-shaped coil 100. The movable projections 562 are provided, on the coil straight part pressing part 56, identical in number to the slots 22 of the stator core 2. The movable projections 562 are disposed between the tapered parts 561*a*, 561*a* of the pair of movable circular discs 561, 561 to project radially toward outside in the radial directions.

Figure 14A:
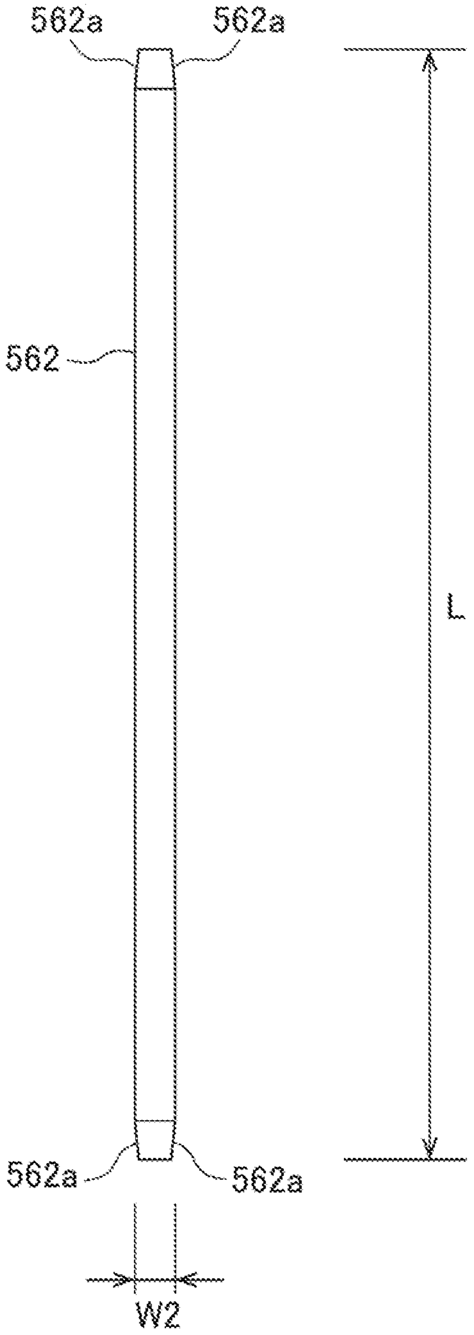
FIG. 14A is a front view illustrating a movable projection of the coil straight part pressing part.
Figure 14B:
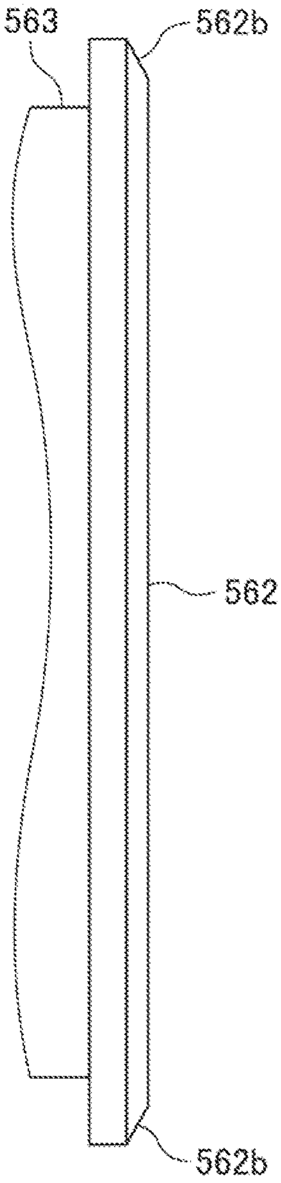
FIG. 14B is a side view illustrating a part of the movable projection of the coil straight part pressing part.
Figure 14C:
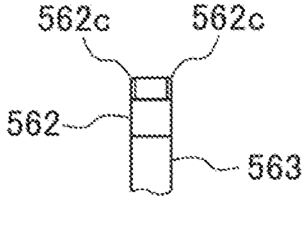
FIG. 14C is a plan view illustrating a part of the movable projection of the coil straight part pressing part.

As illustrated in FIG. 14A, a length L of each of the movable projections 562 is substantially equal to the length of each of the slots 22 in the axial directions of the stator core 2. A width W2 of each of the movable projections 562 is equal to or below a width W1 inside each of the pieces of insulating paper 24 in the slots 22 in the circumferential directions of the slots 22 (see FIG. 3). As illustrated in FIGS. 14A and 14B, the both ends in length directions of each of the movable projections 562 are each formed into a tapered shape, and, at the both ends, both the side surfaces in the circumferential directions and the outside surface in the radial directions of the stator core 2 are respectively provided with tapered parts 562*a*, 562*b*. As illustrated in FIG. 14C, both corners 562*c*, 562*c* on the outside surface in the radial directions of each of the movable projections 562 are rounded.

The operating plates 563 are respectively integrally provided to the insides in the radial directions of the movable projections 562. The operating plates 563 respectively have, at corners in their insides in the radial directions, which respectively correspond to the tapered parts 561*a* of the movable circular discs 561, tapered parts 563*a*, 563*a* along the inclinations of the tapered parts 561*a*. Note that the tapered parts 563*a*, 563*a* of the operating plates 563 respectively fit grooves provided along the tapered parts 561*a* of the movable circular discs 561, which are not illustrated. Thereby, the operating plates 563 are attached radially between the pair of movable circular discs 561, 561.

In a state before insertion into the through hole 20 of the stator core 2, the movable projections 562 disposed radially on the outer circumference of the coil straight part pressing part 56 are maximally reduced in diameter. As illustrated in FIG. 13, an outer diameter D2 of the coil straight part pressing part 56 at this time is equal to or below an inner diameter D1 of the through hole 20 of the stator core 2 (see FIG. 16). From this state, when the gap between the pair of movable circular discs 561, 561 is narrowed by rotation maneuvers of the bolts 564, the tapered parts 561*a* of the movable circular discs 561 push out the tapered parts 563*a* of the operating plates 563 along the inclined surfaces toward outside in the radial directions. Thereby, the movable projections 562 integrally provided to the operating plates 563 project from the space between the pair of movable circular discs 561, 561 toward outside in the radial directions, and the coil straight part pressing part 56 expands in diameter.

Next, a method of inserting the belt-shaped coil 100 wound onto the coil winding jig 4 in the coil insertion apparatus 1 from inside the stator core 2 fixed to the stator core fixing jig 3 into the slots 22 will now be described with reference to FIGS. 15A to 18. Note that FIGS. 15A to 15D only illustrate an area around one of the end faces 2*a* of the stator core 2.

The coil winding jig 4 that has wound the belt-shaped coil 100 into an annular shape is first inserted inside the stator core 2 fixed to the stator core fixing jig 3. After that, the cuff guides 33 move, through driving of the actuators that are not illustrated, toward inside in the radial directions, and pinch and support the cuffs 24*a* of the pieces of insulating paper 24 in the slots 22. Thereby, the pieces of insulating paper 24 are respectively positioned at predetermined positions in the slots 22.

The coil winding jig 4 inserted inside the stator core 2 is, as illustrated in FIGS. 5 and 7, as the main bodies 50 of a pair of the coil diameter expansion devices 5 respectively move toward the coil winding jig 4, pinched and held by the holders 52 of the coil diameter expansion devices 5. At this time, the piece members 533 of the coil end pressing parts 53 are in a state where, as illustrated in FIGS. 8 and 9, they have been reduced in diameter to less than the inner diameter of the belt-shaped coil 100 in the annular shape, and are respectively inserted inside the coil ends 103 of the belt-shaped coil 100.

After that, the piece members 533 of the coil end pressing parts 53 move, through driving of the actuators 54, as illustrated in FIGS. 10 and 11, from the state where they have been reduced in diameter, to expand in diameter. Thereby, the coil ends 103 of the belt-shaped coil 100 wound onto the coil winding jig 4 are pressed at the same time on the whole circumference by the piece members 533 of the coil end pressing parts 53 from inside toward outside to expand in diameter (coil end diameter expanding).

Figure 15A:
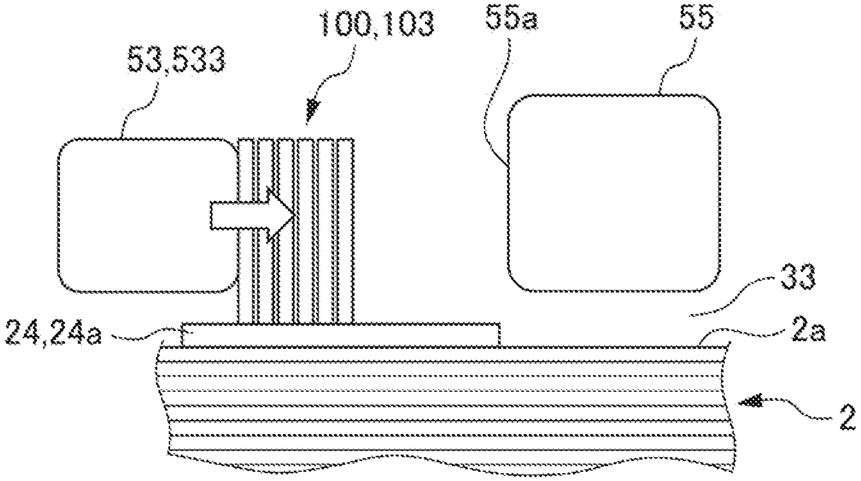
FIG. 15A is a view illustrating how the coil assembly is pressed by the coil end pressing parts and inserted into the slots.

The belt-shaped coil 100 where the coil ends 103 are pressed by the coil end pressing parts 53 gradually expands its whole circumference. Accordingly, the coil straight parts 102 move, while being guided by the comb tooth grooves 43 of the coil winding jig 4, toward the slots 22 of the stator core 2, which are respectively in communication with the comb tooth grooves 43. The coil straight parts 102 of the belt-shaped coil 100 are, without coming into contact with the slots 22 of the stator core 2, inserted from the openings 22*a* of the slots 22 into the slots 22 (FIG. 15A).

Figure 15B:
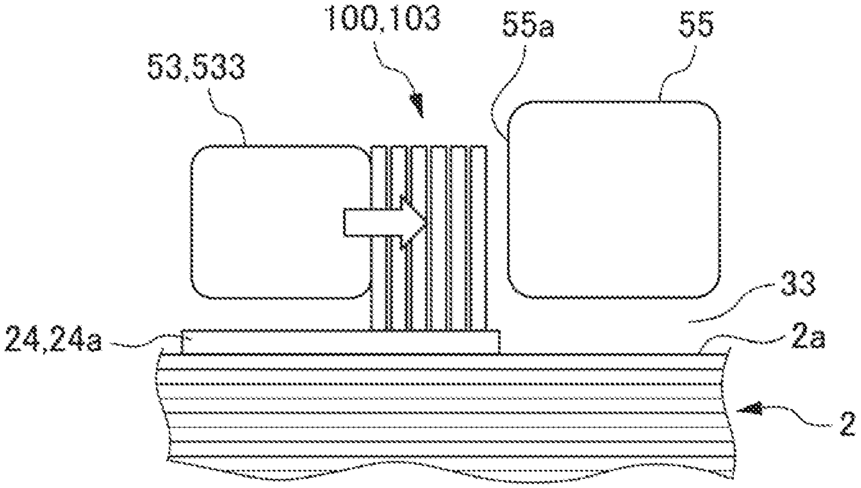
FIG. 15B is a view illustrating how the coil assembly is pressed by the coil end pressing parts toward the limiters.

When the coil end pressing parts 53 further expand in diameter, the coil ends 103 of the belt-shaped coil 100 are respectively pressed by the piece members 533 of the coil end pressing parts 53 to abut the outer-diameter-side ends of the slots 22. Since the inner circumferential surfaces 55*a* of the limiters 55 are disposed slightly more outside than the outer-diameter-side positions of the slots 22, the coil ends 103 and the inner circumferential surfaces 55*a* of the limiters 55 are respectively slightly away from each other (FIG. 15B).

Figure 15C:
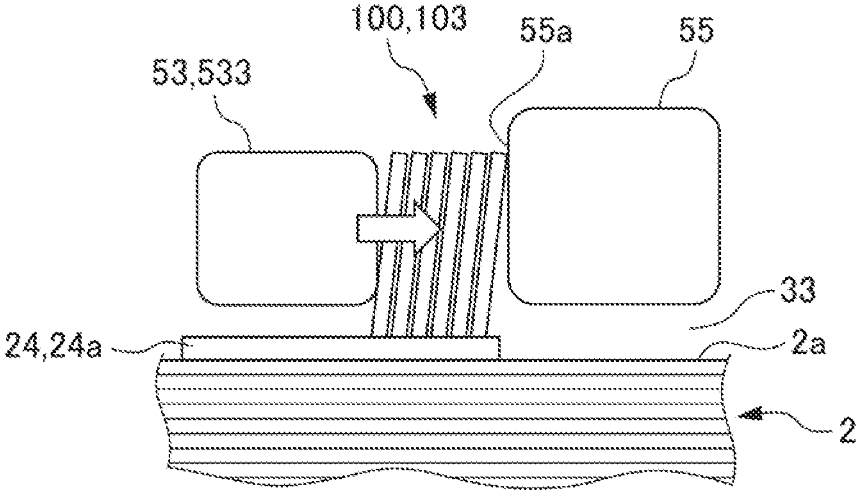
FIG. 15C is a view illustrating how the coil assembly is pressed by the coil end pressing parts toward the limiters.

After the coil ends 103 abut the outer-diameter-side ends of the slots 22, when the coil ends 103 are further pressed, the coil ends 103 deform to incline toward outside in the radial directions and abut the inner circumferential surfaces 55*a* of the limiters 55 (FIG. 15C).

Figure 15D:
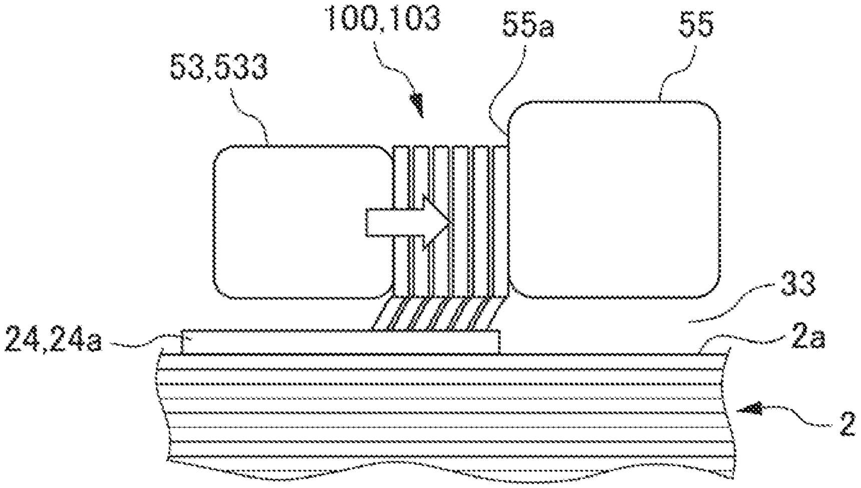
FIG. 15D is a view illustrating how the coil assembly is pressed by the coil end pressing parts toward the limiters.

After that, the coil ends 103 are pressed with respect to the inner circumferential surfaces of the limiters 55 by the pressing forces of the piece members 533 of the coil end pressing parts 53 that expand in diameter. Thereby, the coil ends 103 are pinched between the piece members 533 and the limiters 55 (FIG. 15D).

Figure 16:
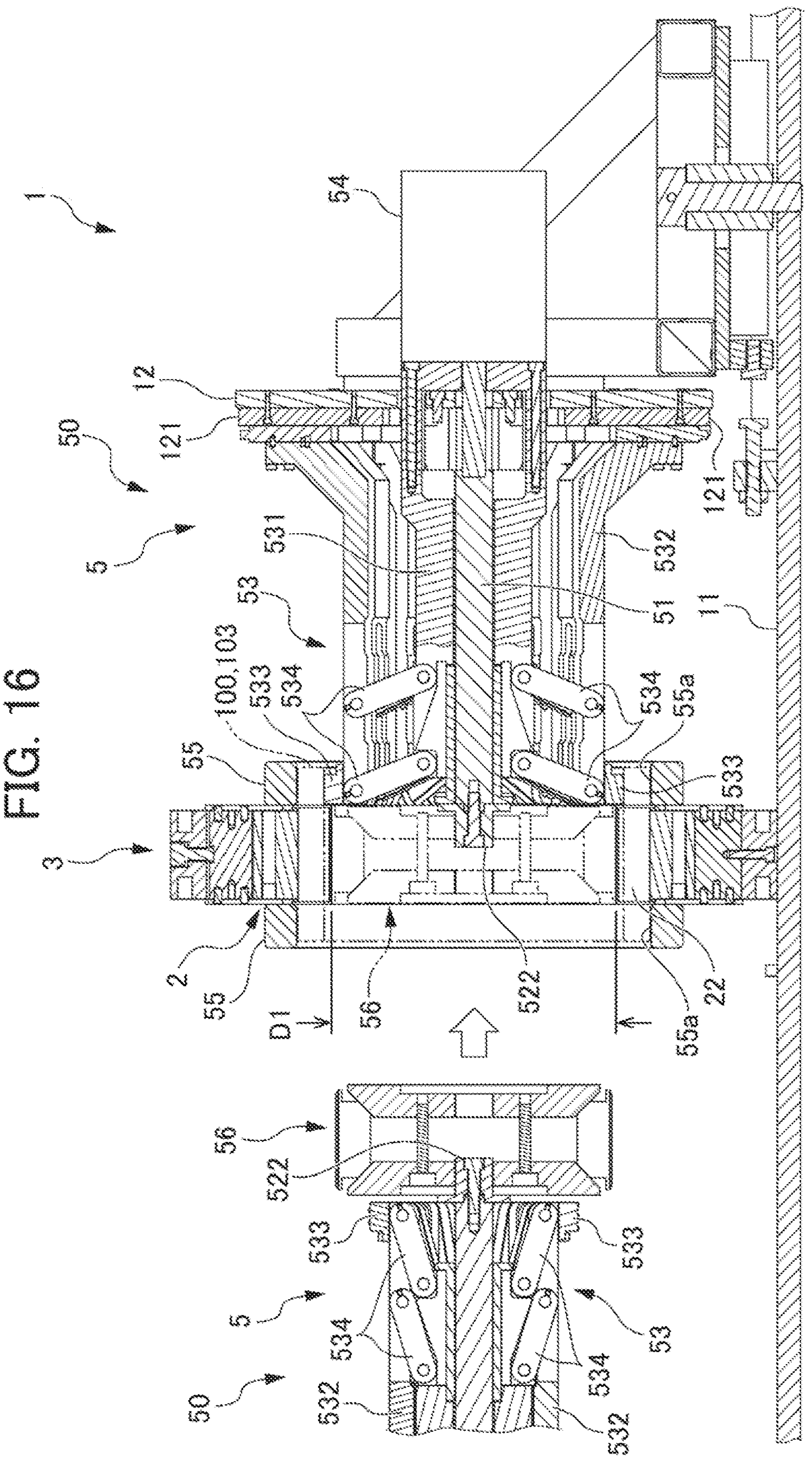
FIG. 16 is a cross-sectional view of the coil insertion apparatus, illustrating how the coil straight part pressing part is inserted inside the stator core.

After the coil straight parts 102 of the belt-shaped coil 100 are respectively inserted into the slots 22, one main body 50 among the main bodies 50, 50 of the pair of coil diameter expansion devices 5, 5 moves away from the stator core 2 to cause the coil winding jig 4 held by the holders 52 to move away from the through hole 20 of the stator core 2. After that, as illustrated in FIG. 16, the holder 52 from which the coil winding jig 4 has been removed is caused to fit the shaft hole 561*b* of the coil straight part pressing part 56 to attach the coil straight part pressing part 56. The movable projections 562 arranged radially have been reduced in diameter at this time, and the outer diameter D2 of the coil straight part pressing part 56 is equal to or below the inner diameter D1 of the through hole 20.

After that, the main body 50 to which the coil straight part pressing part 56 is attached advances again toward the stator core 2, inserting the coil straight part pressing part 56 into the through hole 20 of the stator core 2. As the coil straight part pressing part 56 is inserted into the through hole 20 of the stator core 2, the bolts 564 undergo rotation maneuvers by a robot arm or an operator, for example. Through the rotation maneuvers of the bolts 564, the gap between the pair of movable circular discs 561, 561 is narrowed, and the movable projections 562 arranged radially move from inside the stator core 2 toward outside in the radial directions to expand in diameter (coil straight part diameter expanding).

Figure 17:
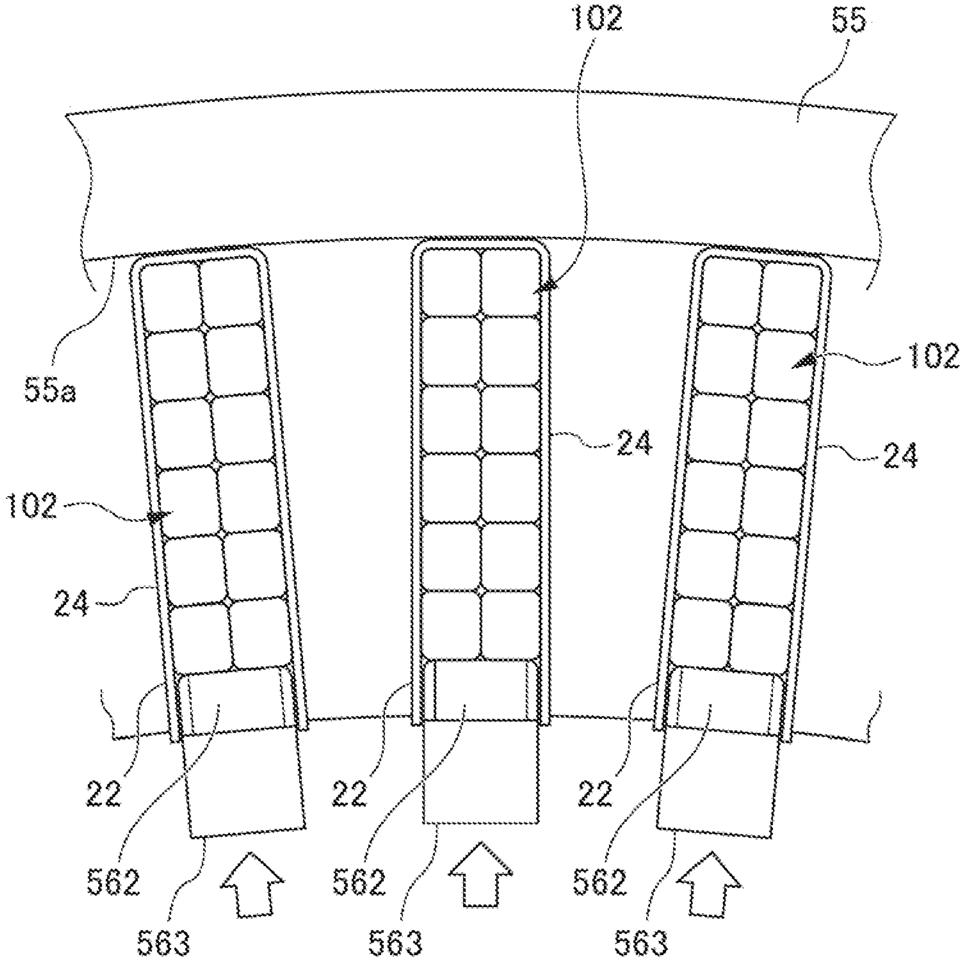
FIG. 17 is a plan view illustrating a state where the coil straight parts in the slots are respectively pressed by the coil straight part pressing part.

Thereby, as illustrated in FIG. 17, the movable projections 562 are respectively inserted from the openings 22*a* of the slots 22 into the slots 22, pressing the coil straight parts 102 of the belt-shaped coil 100 in the slots 22 toward outside in the radial directions. At this time, the piece members 533 of the coil end pressing parts 53 also apply pressing forces toward outside in the radial directions with respect to the coil ends 103 of the belt-shaped coil 100. That is, the operation where the movable projections 562 of the coil straight part pressing part 56 move to expand in diameter and to apply pressing forces to the coil straight parts 102 toward outside in the radial directions is executed together with the operation where the piece members 533 of the coil end pressing parts 53 apply pressing forces to the coil ends 103 toward outside in the radial directions.

Figure 18:
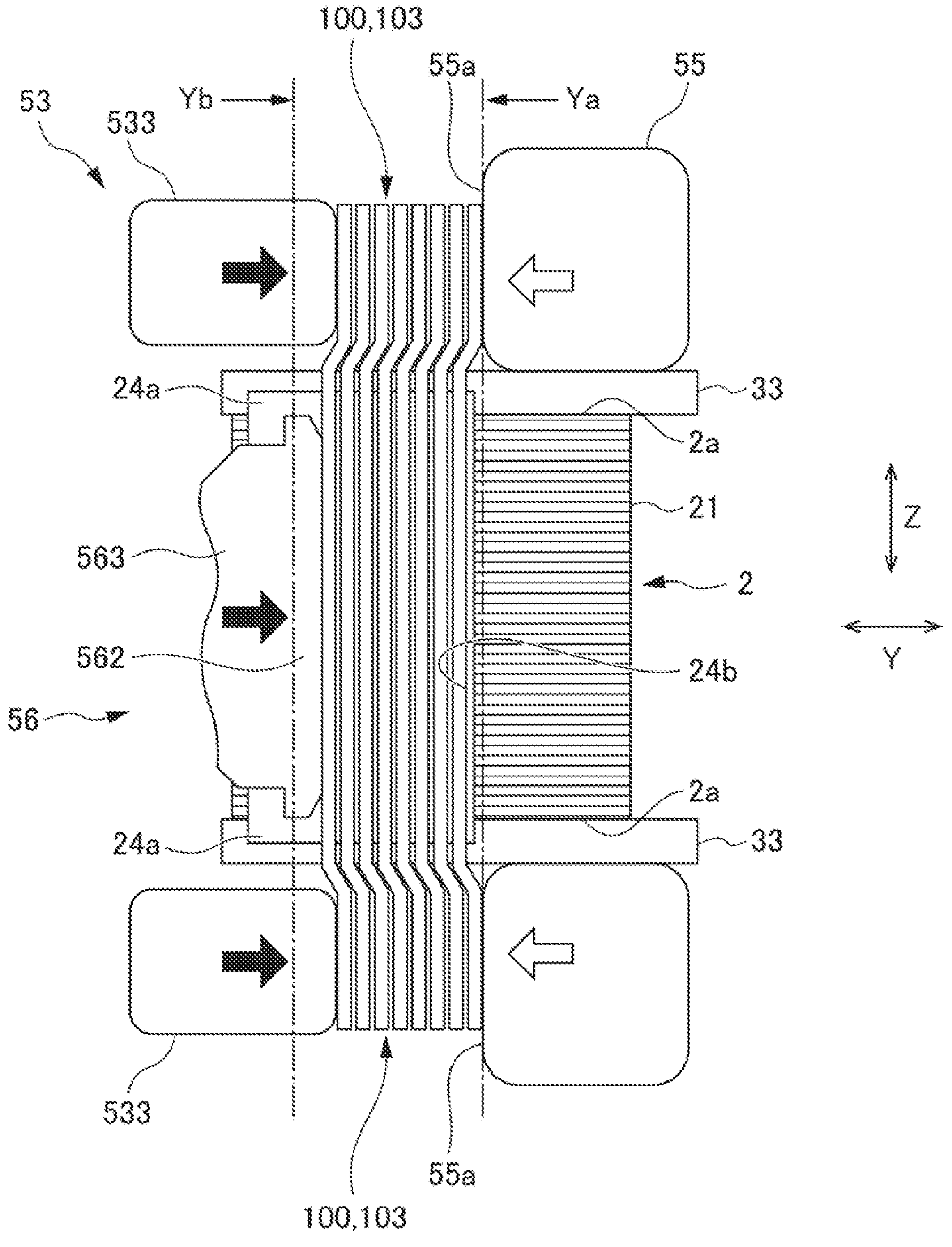
FIG. 18 is a cross-sectional view illustrating a state where the coil ends and the coil straight parts of the coil assembly inserted into the slots are pressed by the coil end pressing parts and the coil straight part pressing part.

When the coil ends 103 are pinched between the piece members 533 and the limiters 55, and the coil straight parts 102 in the slots 22 are pressed by the movable projections 562 of the coil straight part pressing part 56, the outer-diameter-side positions of the coil ends 103 are, as illustrated in FIG. 18, limited at an outer diameter restriction position Ya defined by the inner circumferential surfaces 55*a* of the limiters 55. Since the limiters 55 are disposed outside the slots 22 and are immovable in position, the coil ends 103 are, when respectively pinched between the outer circumferential surfaces 530 of the piece members 533 of the coil end pressing parts 53 and the inner circumferential surfaces 55*a* of the limiters 55, compressed toward outside in the radial directions, i.e., toward the inner circumferential surfaces 55*a* of the limiters 55. The inner-diameter-side positions of the coil ends 103 being compressed move farther toward outside in the radial directions than an inner diameter reference position Yb that is defined before the compression.

As the coil ends 103 are compressed between the piece members 533 of the coil end pressing parts 53 that expand in diameter and the limiters 55 for a predetermined period of time, the coil ends 103 undergo stress that is equal to or above that when undergoing a plastic deformation. Thereby, the direction of remaining stress occurring on the coil ends 103 when expanded in diameter changes, counteracting spring-back effects. As a result, it is suppressed that the belt-shaped coil 100 inserted into the slots 22 moves back toward inside due to the spring-back effects. Furthermore, since outward movements of the coil ends 103 are limited by the limiters 55, the occurrence of such an event that the belt-shaped coil 100 is disintegrated on its forward side in the moving directions is suppressed, and gaps between the coil straight parts 102 laminated in the slots 22 are eliminated. Furthermore, since it is suppressed that the coil straight parts 102 excessively come into contact with backs 24*b* of the pieces of insulating paper 24 in the slots 22, it is suppressed that the pieces of insulating paper 24 collapse.

While the coil ends 103 are compressed between the piece members 533 of the coil end pressing parts 53 and the limiters 55, the coil straight parts 102 in the slots 22 are pressed by the movable projections 562 of the coil straight part pressing part 56 to expand in diameter. Thereby, it is possible that the belt-shaped coil 100 is wholly pressed in a well-balanced manner with respect to the slots 22 in the axial directions of the stator core 2 to expand in diameter on the whole circumference, preventing the coil straight parts 102 of the belt-shaped coil 100 from being deformed and curved toward inside in the radial directions. Therefore, the workability of coil insertion into the slots 22 is improved.

Since the movable projections 562 respectively move from inside the stator core 2 toward outside to expand in diameter, and do not slide on the coil straight parts 102 in the slots 22, there is no possibility of scratching and damaging the coil straight parts 102. Since the tips in the length directions of the movable projections 562 are each formed into a tapered shape to have the tapered parts 562*a*, 562*b*, it is suppressed that the tips of the movable projections 562 respectively come into contact with the stator core 2 when the coil straight part pressing part 56 is inserted into the through hole 20 of the stator core 2. Furthermore, since both the corners 562*c*, 562*c* on the outside surface in the radial directions of the movable projections 562 are rounded, it is suppressed that the pieces of insulating paper 24 are bitten when the movable projections 562 respectively enter the openings 22*a* of the slots 22.

Figure 19:
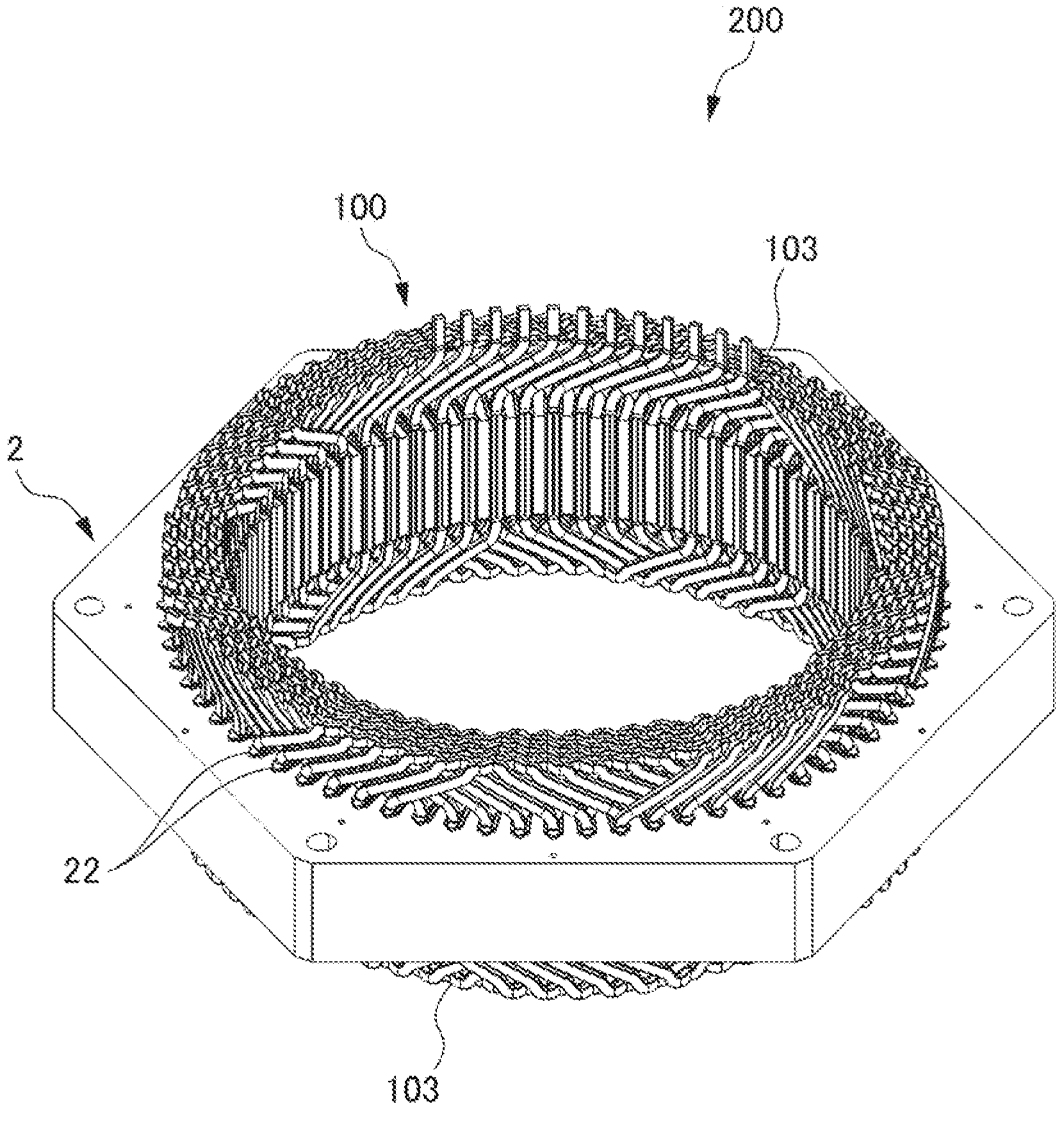
FIG. 19 is a perspective view illustrating a stator.

Thereby, as illustrated in FIG. 19, it is possible to produce a stator 200 where inward return of the belt-shaped coil 100 is suppressed.

Figure 20:
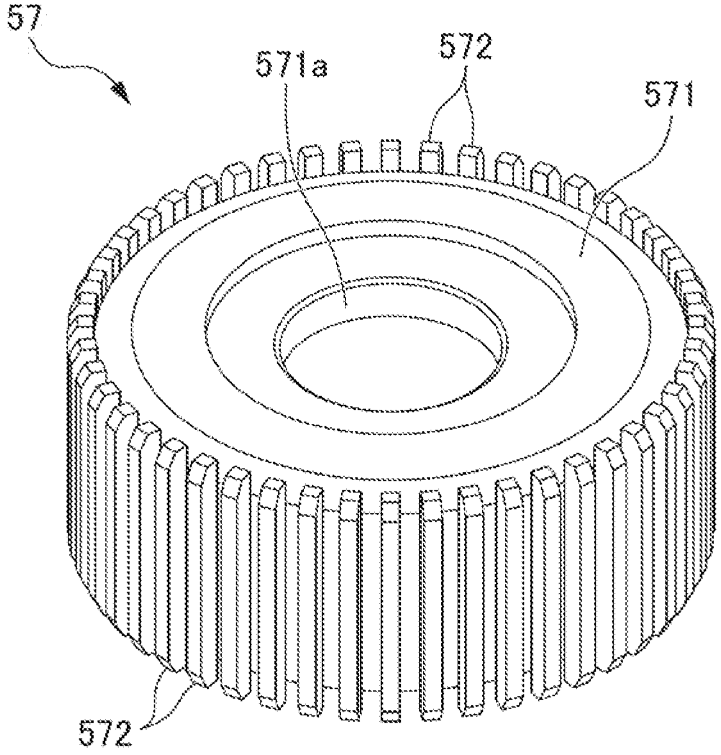
FIG. 20 is a perspective view illustrating a coil straight part pressing part according to another embodiment.
Figure 21:
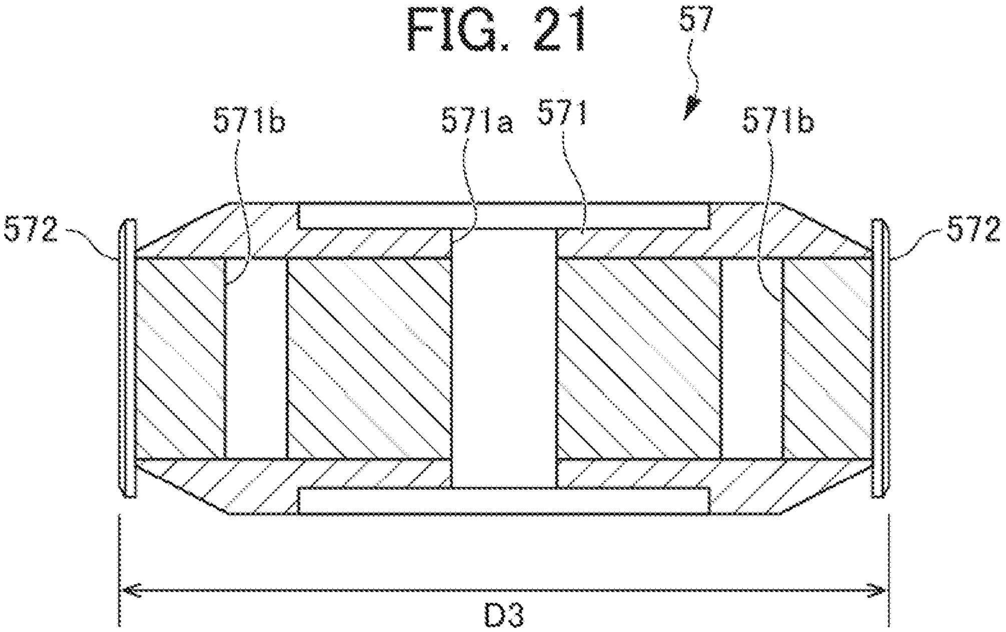
FIG. 21 is a cross-sectional view of the coil straight part pressing part illustrated in FIG. 20.

FIGS. 20 and 21 illustrate a coil straight part pressing part according to another embodiment. A coil straight part pressing part 57 includes a pressing part main body 571 and a plurality of fixed projections 572 disposed on the outer circumference of the pressing part main body 571. The coil straight part pressing part 57 includes no movable parts.

The pressing part main body 571 includes, at its center part, a shaft hole 571*a* that is formed into a substantially cylindrical shape and into which the shaft projections 522 of the holders 52 of the coil diameter expansion devices 5 are insertable.

The fixed projections 572 are respectively made from bar-shaped members extending in the axial directions of the stator core 2 and are provided identical in number to the slots 22 of the stator core 2. The specific configuration of each of the fixed projections 572 is identical to that of each of the movable projections 562 of the coil straight part pressing part 56.

As illustrated in FIG. 21, an outer diameter D3 of the coil straight part pressing part 57 is slightly greater than the inner diameter D1 of the through hole 20 of the stator core 2. Specifically, the outer diameter D3 of the coil straight part pressing part 57 is set in such a manner that a size in the radial directions of a remaining space in each of the slots 22 when the fixed projections 572 are inserted into the slots 22 is identical to or slightly smaller than a size in the radial directions of each of the coil straight parts 102 to be inserted into the slots 22.

The coil straight part pressing part 57 is, similar to the case of the coil straight part pressing part 56 illustrated in FIG. 16, inserted into the through hole 20 of the stator core 2 in a state where it is attached to one of the shaft projections 522 of the holders 52, from which the coil winding jig 4 has been removed. Thereby, the fixed projections 572 of the coil straight part pressing part 57 are respectively inserted from one of the end faces 2*a* of the stator core 2 into the slots 22 after the coil straight parts 102 are inserted. At this time, the fixed projections 572 of the coil straight part pressing part 57 are respectively allowed to slide on the inner-diameter-side surfaces of the coil straight parts 102 in the slots 22 in the axial directions of the stator core 2 and are thus inserted into the slots 22. Therefore, it is possible to simply insert the coil straight part pressing part 57 into the through hole 20 of the stator core 2 to allow the fixed projections 572 to press and expand in diameter the coil straight parts 102 in the slots 22 toward outside in the radial directions.

Since the inner circumferential surfaces 55*a* of the limiters 55 are surfaces perpendicular to the end faces 2*a* of the stator core 2, it is possible to evenly apply pressing forces to the coil ends 103 to lay out the coil ends 103 on the end faces 2*a* of the stator core 2 in a tidy manner. However, the inner circumferential surfaces 55*a* of the limiters 55 are not limited to perpendicular surfaces. The inner circumferential surfaces 55*a* may be inclined surfaces that are inclined toward outside in the radial directions at increasing distances from the end faces 2*a* of the stator core 2 in the axial directions.

Figure 22A:
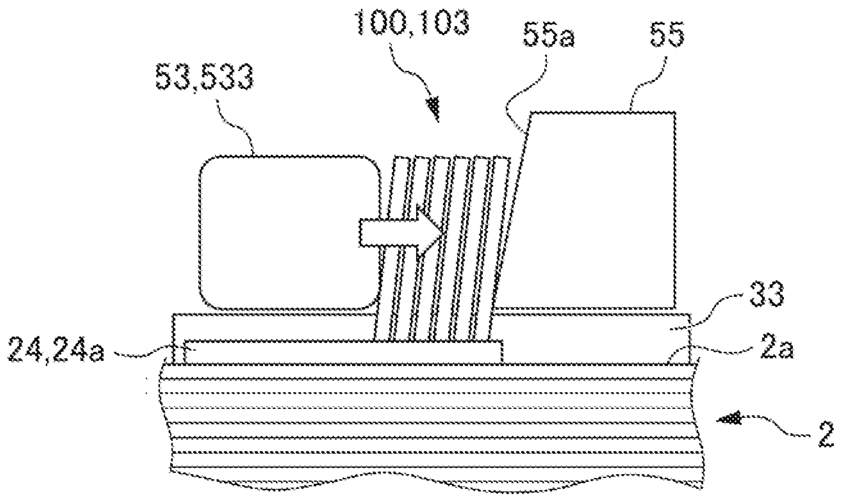
FIG. 22A is a view illustrating how a coil assembly is pressed by coil end pressing parts toward limiters.
Figure 22B:
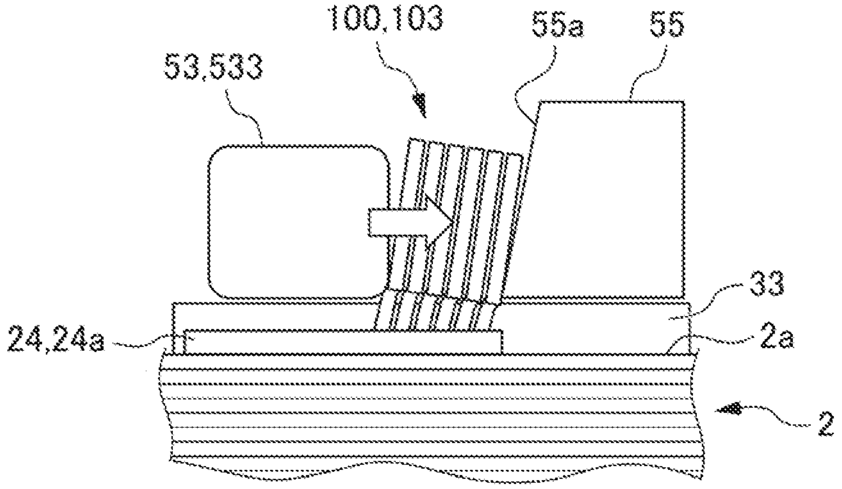
FIG. 22B is a view illustrating how the coil assembly is pressed by the coil end pressing parts toward the limiters.

FIGS. 22A and 22B illustrate how the coil ends 103 are pressed with respect to the limiters 55 when the inner circumferential surfaces 55*a* are inclined surfaces. The coil ends 103 pressed by the piece members 533 of the coil end pressing parts 53 respectively abut the lower end edges of the inner circumferential surfaces 55*a*, which are inclined, of the limiters 55 (the end edges adjacent to the end faces 2*a* of the stator core 2) (FIG. 22A). After that, when the coil ends 103 are further pressed, the coil ends 103 are respectively allowed to incline along the inner circumferential surfaces 55*a*, which are inclined, of the limiters 55 toward outside in the radial directions, and are thus compressed (FIG. 22B). The compressed coil ends 103 are each formed into a shape inclined toward outside in the radial directions at an increasing distance from each of the end faces 2*a* of the stator core 2 in the axial directions. Therefore, it is possible to suppress the projection height of each of the coil ends 103 and to easily secure the respective inner-diameter-side spaces for the coil ends 103 (rotor insertion spaces, for example).

When using such limiters 55, the outer circumferential surfaces of the piece members 533 of the coil end pressing parts 53 may be respectively configured, similar to the inner circumferential surfaces 55*a* of the limiters 55, by inclined surfaces that are inclined toward outside in the radial directions at increasing distances from the end faces 2*a* of the stator core 2 in the axial directions.

As described above, with the coil insertion apparatus 1 according to the present embodiment, it is possible to achieve effects described below. That is, the coil insertion apparatus 1 according to the present embodiment includes the coil diameter expansion devices 5 that expand a diameter of the belt-shaped coil 100 in a wound state from inside the stator core 2 to insert the belt-shaped coil 100 into the slots 22 of the stator core 2. The coil diameter expansion devices 5 each include the coil end pressing part 53 that presses the coil ends 103 of the belt-shaped coil 100 from inside toward outside to expand the diameter, and the coil straight part pressing part 56, 57 that presses the coil straight parts 102 of the belt-shaped coil 100 inserted into the slots 22 from inside toward outside to expand the diameter.

Thereby, the coil ends 103 of the belt-shaped coil 100 to be inserted into the slots 22 are pressed by the coil end pressing parts 53 to expand the diameter, and the coil straight parts 102 are also pressed by the coil straight part pressing part 56, 57 to expand the diameter. Thereby, the belt-shaped coil 100 is pressed in a well-balanced manner with respect to the slots 22, preventing the belt-shaped coil 100 from being deformed and curved when it is expanded in diameter. Therefore, with the coil insertion apparatus 1, it is possible to improve the workability of coil insertion into the slots 22.

In the coil insertion apparatus 1 according to the present embodiment, the coil straight part pressing part 57 includes the fixed projections 572 that are respectively inserted from one of the end faces 2*a* of the stator core 2 into the slots 22 to press the coil straight parts 102 respectively in the slots 22.

Thereby, since, by respectively inserting the fixed projections 572 of the coil straight part pressing part 57 from one of the end faces 2*a* of the stator core 2 into the slots 22, the fixed projections 572 press the coil straight parts 102 in the slots 22, it is possible to effectively prevent the belt-shaped coil 100 from being deformed and curved when it is expanded in diameter.

In the coil insertion apparatus 1 according to the present embodiment, the coil straight part pressing part 56 includes the movable projections 562 that move from inside the stator core 2 toward outside in the radial directions to press the coil straight parts 102 respectively in the slots 22.

Thereby, since, by moving the movable projections 562 of the coil straight part pressing part 56 disposed inside the stator core 2 toward outside in the radial directions, the movable projections 562 press the coil straight parts 102 in the slots 22, it is possible to effectively prevent the belt-shaped coil 100 from being deformed and curved when it is expanded in diameter. By reducing the movable projections 562 in diameter when the coil straight part pressing part 56 is to be inserted inside the stator core 2, it is possible to prevent the movable projections 562 from scratching the coil straight parts 102 and from damaging the coil straight parts 102.

In the coil insertion apparatus 1 according to the present embodiment, the coil diameter expansion devices 5 respectively further include the limiters 55 that are disposed outside the belt-shaped coil 100, that limit outward movements of the coil ends 103 to be expanded in diameter by the coil end pressing parts 53, and that pinch the coil ends 103 with the coil end pressing parts 53.

Thereby, the coil ends 103 are pinched between the coil end pressing parts 53 and the limiters 55, making it possible to counteract spring-back effects that occur at the coil ends 103. Therefore, it is possible to suppress inward return of the coils after insertion into the slots 22 due to the spring-back effects of the coil ends 103, making it possible to further improve the workability of coil insertion. Pinching the coil ends 103 between the coil end pressing parts 53 and the limiters 55 also eliminates gaps between the coils laminated in the slots 22.

In the coil insertion apparatus 1 according to the present embodiment, when the inner circumferential surfaces 55*a* of the limiters 55 are surfaces perpendicular to the end faces 2*a* of the stator core 2, it is possible to evenly apply pressing forces to the coil ends 103, and to lay out the coil ends 103 on the end faces 2*a* of the stator core 2 in a tidy manner.

In the coil insertion apparatus 1 according to the present embodiment, since, when the inner circumferential surfaces 55*a* of the limiters 55 are inclined surfaces that are inclined toward outside in the radial directions at increasing distances from the end faces 2*a* of the stator core 2, it is possible to incline the coil ends 103 toward outside in the radial directions, it is possible to suppress the projection height of each of the coil ends 103, and to easily secure the respective inner-diameter-side spaces for the coil ends 103.

The coil insertion method according to the present invention is directed to a coil insertion method of expanding a diameter of the belt-shaped coil 100 in a wound state from inside the stator core 2 to insert the belt-shaped coil 100 into the slots 22 of the stator core 2, the coil insertion method including: the coil end diameter expanding of allowing the coil end pressing parts 53 disposed inside the belt-shaped coil 100 to press the coil ends 103 of the belt-shaped coil 100 from inside toward outside to expand the diameter; and the coil straight part diameter expanding of allowing the coil straight part pressing part 56, 57 disposed inside the belt-shaped coil 100 to press the coil straight parts 102 of the belt-shaped coil 100 to be inserted into the slots 22 from inside toward outside to expand the diameter, in which the coil straight part diameter expanding is executed together with the coil end diameter expanding to press both the coil ends 103 and the coil straight parts 102 of the belt-shaped coil 100.

Thereby, the coil ends 103 of the belt-shaped coil 100 to be inserted into the slots 22 are pressed by the coil end pressing parts 53 to expand the diameter, and the coil straight parts 102 are also pressed by the coil straight part pressing part 56, 57 to expand the diameter. Thereby, the belt-shaped coil 100 is pressed in a well-balanced manner with respect to the slots 22, preventing the belt-shaped coil 100 from being deformed and curved when it is expanded in diameter. Therefore, with this coil insertion method, it is possible to improve the workability of coil insertion into the slots 22.

In the coil insertion method according to the present embodiment, outward movements of the coil ends 103 to be expanded in diameter by the coil end pressing parts 53 are limited by the limiters 55 disposed outside the coil ends 103, and the coil ends 103 of the belt-shaped coil 100 inserted into the slots 22 are pinched between the coil end pressing parts 53 and the limiters 55.

Thereby, the coil ends 103 are pinched between the coil end pressing parts 53 and the limiters 55, making it possible to counteract spring-back effects that occur at the coil ends 103. Therefore, it is possible to suppress inward return of the coils after insertion into the slots 22 due to the spring-back effects of the coil ends 103, making it possible to further improve the workability of coil insertion. Pinching the coil ends 103 between the coil end pressing parts 53 and the limiters 55 also eliminates gaps between the coils laminated in the slots 22.

Although, in the configuration of the coil insertion apparatus 1 according to the embodiment described above, the axial directions of the stator core 2 and the coil winding jig 4 are disposed to correspond to the horizontal directions, such a configuration may be applied in which the axial directions of the stator core 2 and the coil winding jig 4 are disposed to correspond to other directions such as the perpendicular or vertical directions, instead of the horizontal directions.

EXPLANATION OF REFERENCE NUMERALS

1 Coil insertion apparatus
2 Stator core
2*a* End face
22 Slot
5 Coil diameter expansion device (coil diameter expander)
53 Coil end pressing part
55 Limiter
55*a* Inner circumferential surface
56, 57 Coil straight part pressing part
562 Movable projection
572 Fixed projection
100 Belt-shaped coil (coil assembly)
102 Coil straight part
103 Coil end

What is claimed is:

1. A coil insertion apparatus comprising a coil diameter expander that expands a diameter of a coil assembly in a wound state from inside a stator core to insert the coil assembly into slots of the stator core, the coil diameter expander including a pair of coil end pressing parts that are disposed respectively on axial end portions of the stator core and each press a coil end at each axial end of the coil assembly from inside toward outside to expand the diameter, and a coil straight part pressing part that presses coil straight parts of the coil assembly to be inserted into the slots from inside toward outside to expand the diameter;

wherein the coil diameter expander further includes a pair of limiters that are respectively disposed outside the coil assembly on axial end portions of the stator core, that limit outward movements of the coil ends to be expanded in diameter by the pair of coil end pressing parts, and that respectively pinch the coil ends with the pair of coil end pressing parts.

2. The coil insertion apparatus according to claim 1, wherein the coil straight part pressing part includes fixed projections that are respectively inserted from an end face of the stator core into the slots to press the coil straight parts respectively in the slots.

3. The coil insertion apparatus according to claim 1, wherein the coil straight part pressing part includes movable projections that move from inside the stator core toward outside in radial directions to press the coil straight parts respectively in the slots.

4. The coil insertion apparatus according to claim 1, wherein an inner circumferential surface of each of the pair of limiters is a surface perpendicular to the end face of the stator core.

5. The coil insertion apparatus according to claim 1, wherein an inner circumferential surface of each of the pair of limiters is an inclined surface that is inclined toward outside in the radial directions at an increasing distance from the end face of the stator core.

6. A coil insertion method of expanding a diameter of a coil assembly in a wound state from inside a stator core to insert the coil assembly into slots of the stator core, the coil insertion method comprising:

coil end diameter expanding of allowing a pair of coil end pressing parts respectively disposed inside the coil assembly on axial end portions of the stator core to respectively press coil ends at axial ends of the coil assembly from inside toward outside to expand the diameter; and coil straight part diameter expanding of allowing a coil straight part pressing part disposed inside the coil assembly to press coil straight parts of the coil assembly to be inserted into the slots from inside toward outside to expand the diameter, wherein the coil straight part diameter expanding is executed together with the coil end diameter expanding to press both the coil ends and the coil straight parts of the coil assembly, outward movements of the coil ends to be expanded in diameter by the pair of coil end pressing parts are limited by a pair of limiters respectively disposed outside the coil ends on axial end portions of the stator core, and the coil ends of the coil assembly inserted into the slots are respectively pinched between the pair of coil end pressing parts and the pair of limiters.

* * * * *